(12) United States Patent
Tsuzuki et al.

(10) Patent No.: US 11,018,763 B2
(45) Date of Patent: May 25, 2021

(54) NETWORK SYSTEM, MANAGEMENT DEVICE, AND MANAGEMENT METHOD

(71) Applicant: FUJITSU LIMITED, Kawasaki (JP)

(72) Inventors: Tatsuya Tsuzuki, Kawasaki (JP); Shinji Komiya, Sapporo (JP); Tomoaki Takeyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/002,803

(22) Filed: Aug. 26, 2020

(65) Prior Publication Data

US 2021/0067245 A1 Mar. 4, 2021

(30) Foreign Application Priority Data

Aug. 30, 2019 (JP) .............................. JP2019-158377

(51) Int. Cl.
| | | |
|---|---|---|
| H04B 10/00 | (2013.01) | |
| H04B 10/079 | (2013.01) | |
| H04J 14/02 | (2006.01) | |
| H04B 10/077 | (2013.01) | |
| H04J 14/00 | (2006.01) | |

(52) U.S. Cl.
CPC ... *H04B 10/07953* (2013.01); *H04B 10/0775* (2013.01); *H04B 10/07955* (2013.01); *H04J 14/0212* (2013.01)

(58) Field of Classification Search
CPC ........ H04B 10/07953; H04B 10/07955; H04B 10/07957; H04J 14/0257; H04J 14/026; H04Q 2011/0009
See application file for complete search history.

(56) References Cited

U.S. PATENT DOCUMENTS

| | | |
|---|---|---|
| 2011/0268445 A1 | 11/2011 | Sakurai |
| 2019/0064437 A1* | 2/2019 | Matsuyama ........... H04B 10/60 |
| 2020/0052794 A1* | 2/2020 | Noguchi ............. H04J 14/0224 |

FOREIGN PATENT DOCUMENTS

| | | |
|---|---|---|
| JP | 2011-232695 A | 11/2011 |
| JP | 2015-184480 A | 10/2015 |
| WO | 2017/150278 A1 | 9/2017 |

* cited by examiner

*Primary Examiner* — Daniel G Dobson
(74) *Attorney, Agent, or Firm* — Fujitsu Patent Center

(57) ABSTRACT

A network system includes a plurality of transmission devices, each of which being provided with a wavelength selective switch including a wavelength filter, configured to transmit an optical signal for each channel; and a management device configured to manage the plurality of transmission devices. The wavelength selective switch configured to enable band setting that widens a transmission band of an optical signal of a predetermined channel to the wavelength filter of an adjacent channel. The management device is further configured to calculate an OSNR of the optical signal based on power loss, calculate a bandwidth of the optical signal according to narrowing due to the wavelength filter, determine whether or not the OSNR and the bandwidth respectively satisfies a condition of transmission quality of the optical signal, and decide whether or not to cause the wavelength selective switch to perform the band setting based on a result of the determination.

9 Claims, 26 Drawing Sheets

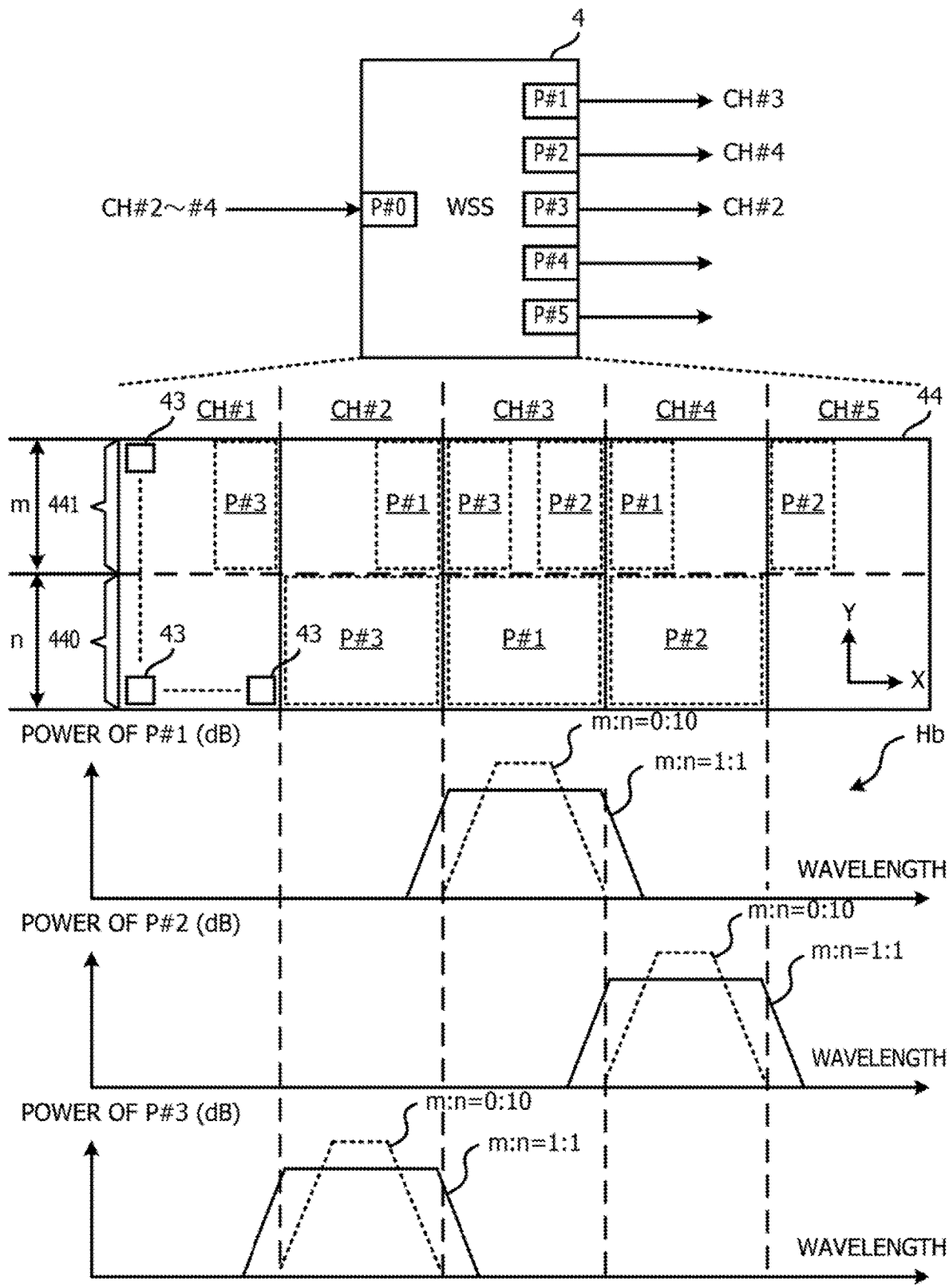

FIG. 9

| MODE ID | MULTILEVEL DEGREE | BAUD RATE | OSNR TOLERANCE | PBN TOLERANCE |
|---|---|---|---|---|
| #1 | 16 | 64(Gbaud) | 21(dB) | 64(GHz) |
| #2 | 32 | 55(Gbaud) | 24(dB) | 55(GHz) |

NETWORK SYSTEM, MANAGEMENT DEVICE, AND MANAGEMENT METHOD

CROSS-REFERENCE TO RELATED APPLICATION

This application is based upon and claims the benefit of priority of the prior Japanese Patent Application No. 2019458377, filed on Aug. 30, 2019, the entire contents of which are incorporated herein by reference.

FIELD

The embodiment discussed herein is related to a network system, a management device, and a management method.

BACKGROUND

In an optical transmission system, when a multilevel degree of modulation of an optical signal is increased, a bit rate increases, but an interval between symbols in constellation of the optical signal becomes narrower, and thus tolerance of an optical signal-to-noise ratio (OSNR) (OSNR tolerance) deteriorates. On the other hand, even if a baud rate is increased, the bit rate itself increases, but a spectrum width of the optical signal widens, and thus it is demanded to widen a wavelength interval between the optical signals of adjacent channels. As the wavelength interval increases, the number of wavelengths in wavelength-multiplexing signal light decreases, and thus a transmission capacity per optical fiber does not increase.

If the baud rate may be increased while maintaining the wavelength interval, for example, a wavelength grid at a predetermined reference value, the transmission capacity increases. However, since a bandwidth of the optical signal becomes wider, the influence of pass band narrowing (PBN) due to a wavelength filter of a wavelength selective switch (WSS) over a path of the optical signal increases, for example.

In contrast, for example, there is a technique in which an overlapping band is provided between optical filters of adjacent channels by adjusting a diffraction efficiency of a liquid crystal on silicon (LCOS) element of the WSS to widen a transmission band of the optical signal, in order to suppress pass band narrowing of the optical signal (for example, see International Publication Pamphlet No. WO 2017/150278).

SUMMARY

According to an aspect of the embodiments, a network system includes: a plurality of transmission devices, each of which being provided with a wavelength selective switch including a wavelength filter, configured to transmit an optical signal for each channel; and a management device configured to manage the plurality of transmission devices, wherein the wavelength selective switch configured to enable band setting that widens a transmission band of an optical signal of a predetermined channel to the wavelength filter of an adjacent channel, the management device is further configured to: calculate an OSNR of the optical signal of the predetermined channel based on power loss due to the wavelength filter over a path of the optical signal of the predetermined channel; calculate a bandwidth of the optical signal of the predetermined channel according to narrowing due to the wavelength filter over the path; determine whether or not the OSNR and the bandwidth respectively satisfies a condition of transmission quality of the optical signal of the predetermined channel; and decide whether or not to cause the wavelength selective switch to perform the band setting based on a result of the determination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A is a diagram illustrating an example of control of a mirror array when the mirror setting is performed;

FIG. 9 is a diagram illustrating an example of mode information;

DESCRIPTION OF EMBODIMENTS

In the technique disclosed in International Publication Pamphlet No. WO 2017/150278, the transmission band of the optical signal is widened by outputting the optical signal of a certain channel not only to a corresponding port but also to a port of the adjacent channel, and thus the PBN is improved. However, since the transmission band is widened, power loss of the optical signal is increased. As a result, there is a problem that the OSNR deteriorates.

In one aspect, an object of the embodiment is to provide a network system capable of achieving both an optical signal-to-noise ratio of an optical signal and pass band narrowing.

(Network System)

Figure 1:
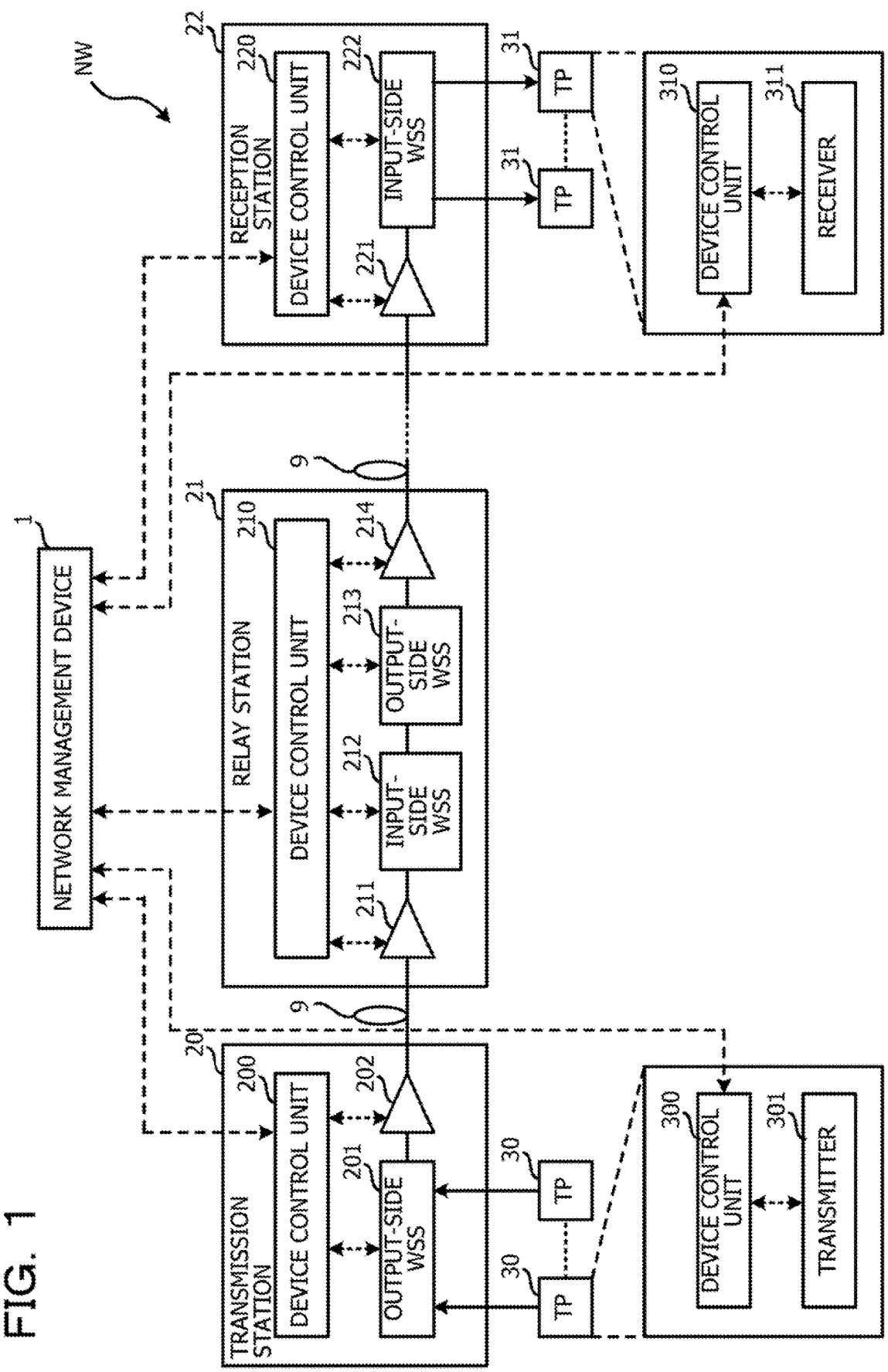
FIG. 1 is a configuration diagram illustrating an example of a network system.

FIG. 1 is a configuration diagram illustrating an example of a network system. The network system includes a network management device 1 and a network NW.

The network NW includes a transmission device 20 of a transmission station, a transmission device 21 of a relay station, a transmission device 22 of a reception station, a transmission-side transponder (TP) 30, and a reception-side transponder 31. The transmission devices 20 to 22 are coupled to each other via a transmission path 9 such as an optical fiber. Although FIG. 1 illustrates the transmission devices 20 to 22 over a path of an optical signal of a predetermined channel among a plurality of channels to which individual wavelengths are allocated, a large number of transmission devices 20 to 22 are provided in an actual network NW.

The network management device 1 manages the transmission devices 20 to 22, the transmission-side TP 30, and the reception-side TP 31 via a communication line (not illustrated). The network management device 1 is an example of a management device.

The transmission device 20 of the transmission station includes a device control unit 200, an output-side wavelength selective switch (WSS) 201, and a post-amplifier 202. A plurality of transmission-side TPs 30 are optically coupled to the output-side WSS 201.

The transmission-side TP 30 includes a device control unit 300 and a transmitter 301. The transmitter 301 includes, for example, a light source of transmission light, an optical modulator that optically modulates the transmission light to generate an optical signal, and a mapping circuit that generates symbol data input to the optical modulator by multilevel modulation. The transmitter 301 transmits the optical signal to the transmission device 20 of the transmission station according to a digital coherent optical transmission scheme as an example.

The device control unit 300 sets various settings such as a wavelength and mode of the optical signal for the transmitter 301 according to the instruction from the network management device 1. The mode includes settings such as a multilevel degree of multilevel modulation and a baud rate of the optical signal. The transmission-side TPs 30 transmit optical signals of different channels to the transmission device 20 of the transmission station. The device control unit 300 includes circuits such as a central processing unit (CPU), a memory, a field-programmable gate array (FPGA), and an application-specified integrated circuit (ASIC).

The optical signal in units of channels is input from each transmission-side TP 30 to the output-side WSS 201. The output-side WSS 201 generates a wavelength-multiplexed optical signal by performing wavelength multiplexing on the optical signals of at least some channels. The wavelength-multiplexed optical signal is input to the post-amplifier 202.

The post-amplifier 202 amplifies the wavelength-multiplexed optical signal and outputs the wavelength-multiplexed optical signal to the transmission path 9. The wavelength-multiplexed optical signal is input from the transmission path 9 to the transmission device 21 of the relay station.

The device control unit 200 sets various settings for the output-side WSS 201 and the post-amplifier 202 according to an instruction from the network management device 1. As will be described later, the device control unit 200 may widen a transmission band for each channel by controlling a mirror of the output-side WSS 201. The device control unit 200 includes circuits such as the CPU, the memory, the FPGA, and the ASIC.

The transmission device 21 of the relay station includes a device control unit 210, a pre-amplifier 211, an input-side WSS 212, an output-side WSS 213, and a post-amplifier 214. The wavelength-multiplexed optical signal is input to the pre-amplifier 211 from the transmission path 9. The pre-amplifier 211 amplifies the wavelength-multiplexed optical signal and outputs the wavelength-multiplexed optical signal to the input-side WSS 212.

The input-side WSS 212 separates the wavelength-multiplexed optical signal into optical signals in units of channels and outputs the optical signals to the output-side WSS 213. The output-side WSS 213 generates a wavelength-multiplexed optical signal by performing wavelength multiplexing on the optical signals of at least some channels. The wavelength-multiplexed optical signal is input to the post-amplifier 214.

The post-amplifier 214 amplifies the wavelength-multiplexed optical signal and outputs the wavelength-multiplexed optical signal to the transmission path 9. Similarly as described above, the wavelength-multiplexed optical signal is input to the transmission device 22 of the reception station after passing through the transmission devices 21 of the plurality of relay stations.

The device control unit 210 sets various settings for the input-side WSS 212, the output-side WSS 213, the pre-amplifier 211, and the post-amplifier 202 according to the instruction from the network management device 1. As will be described later, the device control unit 210 may widen the transmission band for each channel by controlling the mirrors on the input-side WSS 212 and the output-side WSS 213. The device control unit 210 includes circuits such as the CPU, the memory, the FPGA, and the AMC.

The transmission device 22 of the reception station includes a device control unit 220, a pre-amplifier 221, and an input-side WSS 222. The wavelength-multiplexed optical signal is input to the pre-amplifier 221 from the transmission path 9. The pre-amplifier 221 amplifies the wavelength-multiplexed optical signal and outputs the wavelength-multiplexed optical signal to the input-side WSS 222.

The input-side WSS 222 separates the wavelength-multiplexed optical signal into optical signals in units of channels, and outputs the optical signals to a plurality of reception-side TPs 31.

The reception-side TP 31 includes a device control unit 310 and a receiver 311. The receiver 311 includes, for example, a light source of local light emission, an optical circuit that detects an optical signal by local light emission, a photoelectric conversion module that converts the optical signal into an electric signal, and a de-mapping circuit that demodulates symbol data of the electric signal to reproduce original data. The receiver 311 receives the optical signal according to the digital coherent optical transmission scheme as an example.

The device control unit 310 sets various settings such as the wavelength of the optical signal and the mode for the receiver 311 according to an instruction from the network management device 1. The reception-side TPs 31 receives optical signals of different channels. The device control unit 310 includes circuits such as the CPU, the memory, the FPGA, and the ASIC.

The device control unit 220 sets various settings for the input-side WSS 222 and the pre-amplifier 211 according to the instruction from the network management device 1. As will be described later, the device control unit 210 may widen the transmission band for each channel by controlling the mirror of the input-side WSS 222. The device control unit 220 includes circuits such as the CPU, the memory, the FPGA, and the ASIC.

In this way, the optical signal passes through the plurality of input-side WSSs 212 and 222 and output-side WSSs 201 and 213, and thus a band of the optical signal is narrowed. In the following, a WSS 4 is taken as an example of the input-side WSSs 212 and 222 and the output-side WSSs 201 and 213, and a configuration thereof is described.

(Configuration of WSS 4)

Figure 2:
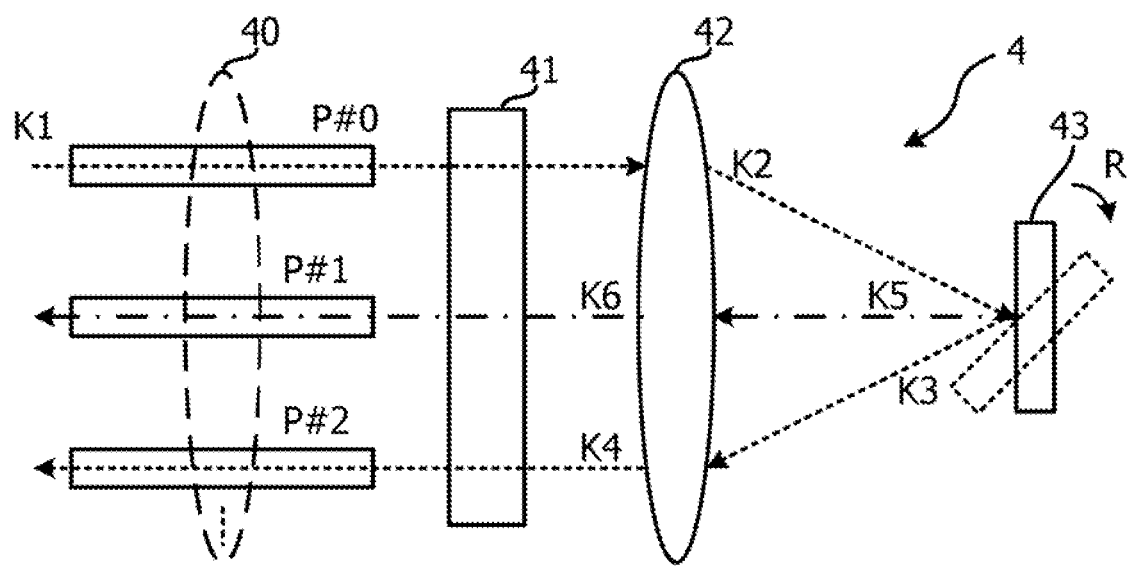
FIG. 2 is a configuration diagram illustrating an example of a WSS.

FIG. 2 is a configuration diagram illustrating an example of the WSS 4. The WSS 4 includes an optical fiber array 40, a diffraction grating 41, a lens 42, and a mirror 43. The optical fiber array 40 includes an input port P #0 and output ports P #1 and P #2.

The wavelength-multiplexed optical signal is input to the lens 42 from the input port P #0 through the diffraction grating 41, as indicated by a reference symbol K1. The diffraction grating 41 separates the optical signal for each wavelength from the wavelength-multiplexed optical signal by a diffraction phenomenon of light. The lens 42 condenses the optical signal on the mirror 43 according to the wavelength thereof, as indicated by a reference symbol K2.

The mirror 43 is disposed in a mirror array for each channel. The mirror 43 is a micro electro mechanical systems (MEMS) mirror or an LCOS element, and rotates under control of the device control units 200, 210, and 220. The mirror 43 reflects the optical signal incident from the lens 42 toward the lens 42 at an angle according to the angle of the mirror 43, as indicated by a reference symbol K3. The reflected optical signal passes through the lens 42 and the diffraction grating 41, and is output from the port P #2, as indicated by a reference symbol K4.

When the mirror 43 rotates to a position indicated by a dotted line as indicated by a reference symbol R, the optical signal is reflected toward the lens 42 at an angle according to the angle of the mirror 43 as indicated by a reference symbol K5. The reflected optical signal passes through the lens 42 and the diffraction grating 41, and is output from the port P #1 as indicated by a reference symbol K6.

In this way, the mirror 43 may output the optical signal to the ports P #1 and P #2 according to the angle. The device control units 200, 210, and 220 control the rotation of some mirrors 43 of the mirror array provided for each channel to perform setting so that the optical signal is output not only from the output port of the channel but also from an output port of an adjacent channel in order to suppress narrowing of a band of the optical signal. This setting will be referred to as "mirror setting" in the following description.

(Mirror Setting)

Figure 3:
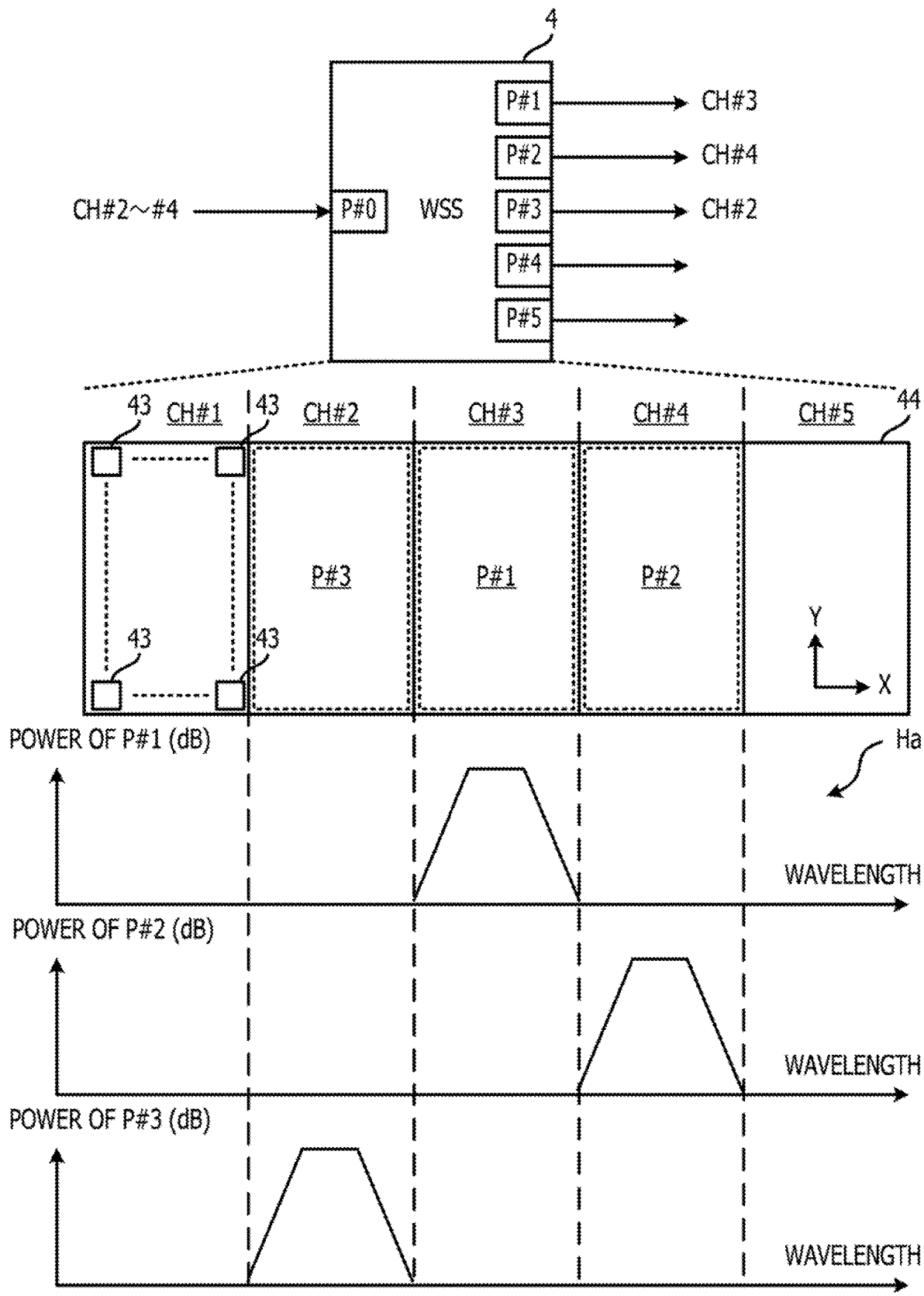
FIG. 3 is a diagram illustrating an example of control of a mirror array when mirror setting is not performed.

FIG. 3 is a diagram illustrating an example of control of a mirror array 44 when the mirror setting is not performed, As an example, the WSS 4 includes 1×5 ports P #0 to P #5. The port P #0 is an input port, and the ports P #1 to P #5 are output ports. As an example, an operation when an optical signal of channels CH #2 to CH #4 is input from the port P #0 and optical signals of the channels CH #3, CH #4, and CH #2 are output from the ports P #1 to P #3 will be described.

The WSS 4 includes the mirror array 44 for each of the channels CH #1 to CH #5. In the WSS 4, the mirror arrays 44 of the CH #2 to CH #4 are arranged along an arrangement direction X. The mirror array 44 of each of channels CH #1 to CH #5 includes the mirrors 43 arranged vertically and horizontally. The lens 42 causes the optical signal to be incident on the mirror array 44 of the channel corresponding to the wavelength.

All the mirrors 43 in each mirror array 44 causes the optical signals to be incident on the ports P #1 to P #5 corresponding to the channels CH #1 to CH #5 of optical signals. For example, each mirror 43 of the channel CH #2 causes the optical signal of a wavelength of the channel CH #2 to be incident on the port P #3, and each mirror 43 of the channel CH #3 causes the optical signal of the wavelength of the channel CH #3 to be incident on the port P #1, and each mirror 43 of the channel CH #4 causes the optical signal of the wavelength of the channel CH #4 to be incident on the port P #2.

Reference symbol Ha indicates examples of spectra of the optical signals output from the ports P #1 to P #3. In each graph of reference symbol Ha, the horizontal axis represents a wavelength of the optical signal and the vertical axis represents power of the optical signal.

Each of the ports P #1 to P #3 outputs an optical signal in an individual wavelength band corresponding to, for example, a 75-GHz grid. The port P #1 outputs an optical signal in the wavelength band of the channel CH #3, the port P #2 outputs an optical signal in the wavelength band of the channel CH #4, and the port P #3 outputs an optical signal in the wavelength band of the channel CH #2.

In this way, when the mirror setting is not performed, the ports P #1, P #2, and P #3 output only the optical signals of channels CH #3, CH #4, and CH #2, respectively.

FIG. 4A is a diagram illustrating an example of control of the mirror array 44 when the mirror setting is performed. In FIG. 4A, the same components as those in FIG. 3 are denoted by the same reference symbols, and the description thereof will be omitted. The mirror setting is an example of band setting for widening the transmission band of the optical signal of a predetermined channel to the wavelength filter of the adjacent channel.

As an example, some mirrors 43 of the mirror array 44 of each of CH #2 to CH #4 make the optical signal incident on the ports P #1 to P #3 of the adjacent channels CH #1 to CH #5. In this case, the mirrors 43 of each mirror array 44 are divided into two regions 441 and 440 at a ratio of m:n (m and n are numbers of mirrors) along a direction Y perpendicular to the arrangement direction X. The m/n is denoted as a "mirror splitting ratio". In this example, mirror setting is performed with m:n=1:1. The regions 440 and 441 are examples of a first region and a second region, respectively, and the X-direction and the Y-direction are examples of a first direction and a second direction, respectively.

The mirrors 43 in the region 440 of the channels CH #2 and CH #3 cause the optical signals of the channels CH #2 and CH #3 to be incident on the ports P #3 and P #1 respectively, similarly as in the case where the mirror setting is not performed. On the other hand, the mirrors 43 in the region 441 of the channel CH #2 and CH #3 cause the optical signals of the channels CH #2 to CH #4 to be incident on the ports P #3, P #1, and P #2 corresponding to the adjacent channels CH #2 to CH #4.

For example, the mirror 43 in the sub-region 441 of the channel CH #2 causes the optical signal to be incident on the port P #1 corresponding to the adjacent channel CH #3. The mirrors 43 in the region 441 of the channel CH #3 cause the optical signal to be incident on the ports P #3 and P #2 corresponding to the adjacent channels CH #2 and CH #4. The mirror 43 in the sub-region 441 of the channel CH #4 causes the optical signal to be incident on the port P #1 corresponding to the adjacent channel CH #3.

As for the mirror arrays 44 of unused channels CH #1 and CH #5, the mirror 43 in the region 441 of the channel CH #1 causes the optical signal of the channel CH #1 to be incident on the port P #3 corresponding to the adjacent channel CH #2. The mirror 43 in the region 441 of the channel CH #5 causes the optical signal of the channel CH #5 to be incident on the port P #2 corresponding to the adjacent channel CH #4.

In this way, the optical signals of CH #2 to CH #4 are incident not only on the ports P #3, P #1, and P #2 corresponding to CH #2 to CH #4 but also on the ports P #3, P #1, and P #2 corresponding to the adjacent channels CH #1 to CH #5.

Reference symbol Hb indicates an example of spectra of the optical signals output from the ports P #1 to P #3. In each graph of reference symbol Hb, the horizontal axis represents the wavelength of the optical signal and the vertical axis represents the power of the optical signal.

The dotted line is the spectrum when m:n=0:10 described as a reference. This spectrum has the same waveform as that of the example of FIG. 3 in which the regions 440 and 441 are not divided.

The solid line is the spectrum when m:n=1:1. For example, the spectrum of the port P #1 includes a component of the optical signal from the region 440 of the channel CH #3 and components of the optical signals from the region 441 of the adjacent channels CH #2 and CH #4. The spectrum of the port P #2 includes the component of the optical signal from the region 440 of the channel CH #4 and the components of the optical signals from the region 441 of the adjacent channels CH #3 and CH #5. The spectrum of the port P #3 includes the component of the optical signal from the region 440 of the channel CH #2 and the components of the optical signals from the region 441 of the adjacent channels CH #1 and CH #3.

Accordingly, the wavelength band of the optical signals output from the ports P #1 to P #3 widens to the wavelength bands of the adjacent channels CH #3, CH #4, and CH #2.

In this way, the mirror array 44 transmits the optical signal of each of the channels CH #1 to CH #5. When the mirror setting is performed, the mirror array 44 widens the transmission band of the optical signals of the predetermined channels CH #2 to CH #4 to the mirror arrays 44 of the adjacent channels CH #1 to CH #5.

For that reason, the transmission band of the optical signal is widened in the WSS 4, and thus narrowing of the band of the optical signal is suppressed. The mirror array 44 is an example of a wavelength filter.

In this case, it is not demanded for all the mirrors 43 in the region 441 of each of the channels CH #1 to CH #5 to make light incident on the ports P #1 to P #3 of the adjacent channels. If the transmission band of the optical signals of the predetermined channels CH #2 to CH #4 is equal to or larger than the wavelength interval between the channels, a sufficient transmission band is secured for the optical signals regardless of the number of the WSSs 4 through which the optical signals pass. For that reason, it suffices that the smallest number of mirrors 43 whose transmission band of the optical signal is equal to or larger than a channel interval make light incident on the ports P #1 to P #3 of the adjacent channels. If too many mirrors 43 cause light to be incident on the ports P #1 to P #3 of the adjacent channels, crosstalk may occur between the ports P #1 to P #3.

Figure 4B:
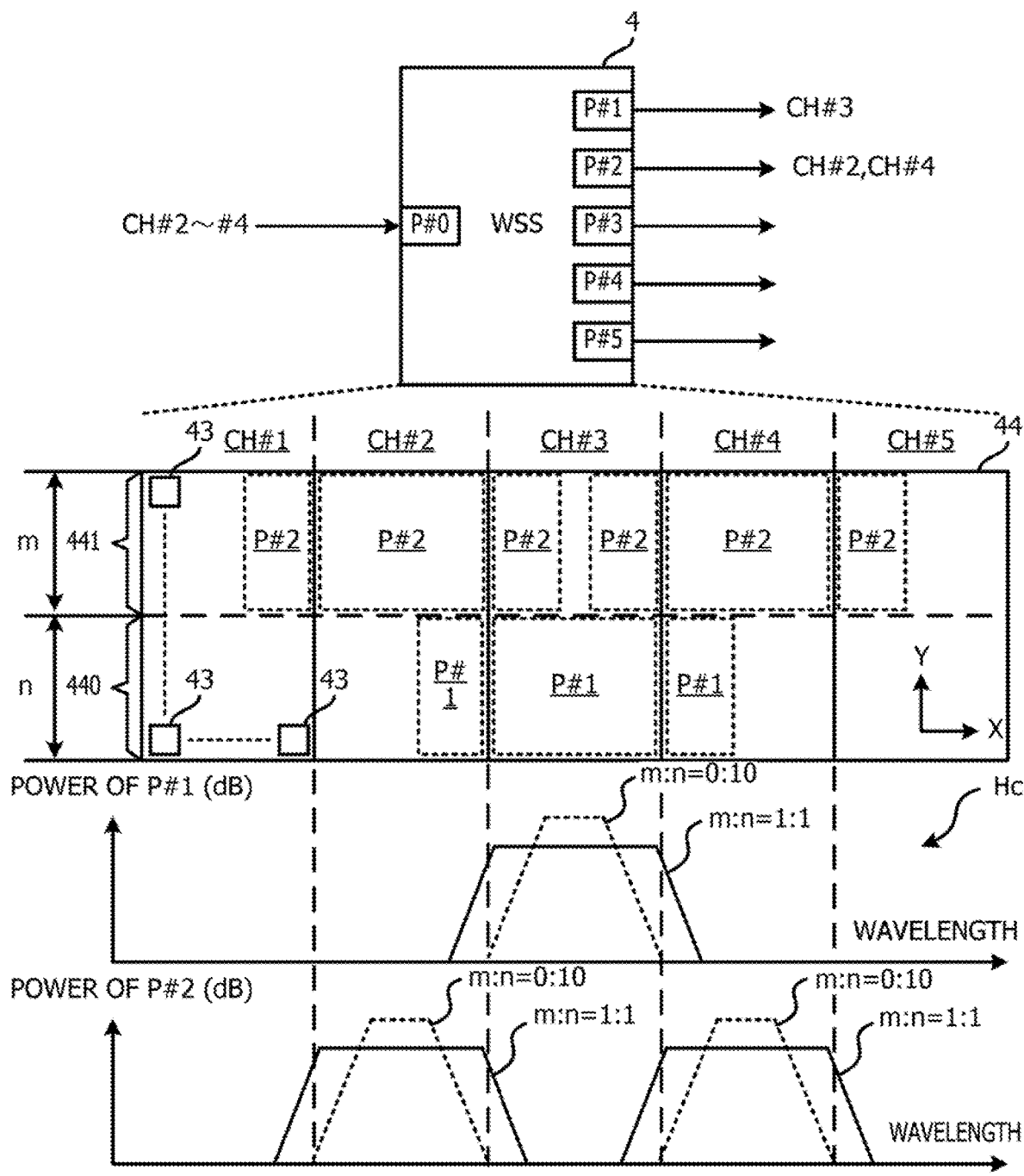
FIG. 4B is a diagram illustrating another example of control of the mirror array when the mirror setting is performed.

FIG. 4B is a diagram illustrating another example of control of the mirror array 44 when the mirror setting is performed. In FIG. 4B, the same components as those in FIGS. 3 and 4A are denoted by the same reference symbols, and the description thereof will be omitted. In this example, the optical signal of the channel CH #2 is output from the port P #2 instead of the port P #3. Also in this example, the mirror setting is performed with m:n−1:1.

The mirror 43 in the region 440 of the channel CH #3 causes the optical signal of the channel CH #3 to be incident on the port P #1, and the mirror 43 in the region 441 of the channel CH #3 causes the optical signal of the channel CH #3 to be incident on the port P #2 corresponding to the adjacent channels CH #2 and CH #4. The mirrors 43 in the region 441 of the channels CH #2 and CH #4 cause the optical signals of the channels CH #2 and CH #4 to be incident on the port P #2, and the mirrors 43 in the region 440 of the channels CH #2 and CH #4 cause the optical signals of the channels CH #2 and CH #4 to be incident on the port P #1.

As for the mirror arrays 44 of unused channels CH #1 and CH #5, the mirror 43 in the region 441 of the channel CH #1 causes the optical signal of the channel CH #1 to be incident on the port P #2 corresponding to the adjacent channel CH #2. The mirror 43 in the region 441 of the channel CH #5 causes the optical signal of the channel CH #5 to be incident on the port P #2 corresponding to the adjacent channel CH #4.

Reference symbol Hc indicates an example of spectra of the optical signals output from the ports P #1 to P #3. In each graph of reference symbol Hc, the horizontal axis represents the wavelength of the optical signal and the vertical axis represents the power of the optical signal.

With the mirror setting described above, the wavelength band of the optical signal of the channel CH #3 output from the port P #1 widens to the wavelength bands of the adjacent channels CH #2 and CH #4. The wavelength band of the optical signals of the channels CH #2 and CH #4 output from the port P #2 widens to the wavelength bands of the adjacent channels CH #1, CH #3, and CH #5.

As may be understood by referring to the reference symbols Hb and Hc, the transmission band of the optical signal becomes wider as the mirror splitting ratio becomes larger, and thus narrowing of the band is more effectively suppressed. However, power of the optical signal becomes smaller as the mirror splitting ratio becomes larger.

For that reason, when the mirror setting is performed, the (SNR may be deteriorated due to an increase in loss of optical signal. If the mirror splitting ratio is set to 1 (m:n=1:1) as in this example, the loss of optical signal may increase by 3 (dB), for example, compared to when the mirror setting is not performed, but since the transmission band of the optical signal corresponding to the wavelength interval (wavelength grid) between the channels is secured, the effect of suppressing narrowing of the band due to the mirror setting may be exerted most.

In this way, in the WSS 4, when the mirror setting is performed, the transmission band of the optical signal of the predetermined channel is widened and power loss of the optical signal of the predetermined channel increases. The WSS 4 includes the mirror array 44 for each channel which functions as the wavelength filter is arranged in the first direction and a plurality of ports P #1 to P #5 onto which the optical signals reflected by the mirror array 44 are incident.

When the mirror setting is performed, the WSS 4 controls the angles of the mirror 43 in the region 440 and the mirror 43 in the region 44 to be different values so that the optical signals are incident from the mirror 43 in the region 440 and the mirror 43 in the region 441, which are obtained by dividing the mirror array 14 in the direction Y perpendicular to the direction X at a ratio of 1:1, to the different ports P #1 to P #3. For that reason, the WSS 4 may effectively suppress narrowing of the band of the optical signal by the mirror setting.

(Configuration of Network Management Device 1 of First Example)

The network management device 1 calculates the OSNR from the power loss due to the mirror array 44 of the WSS 4 over the path of the optical signal, and also calculates the bandwidth of the optical signal according to narrowing due to the mirror array 44. The network management device 1 determines whether or not the OSNR and the band satisfy transmission quality of the optical signal, and decides whether or not to perform the mirror setting on the WSS 4 according to the determination result.

Figure 5:
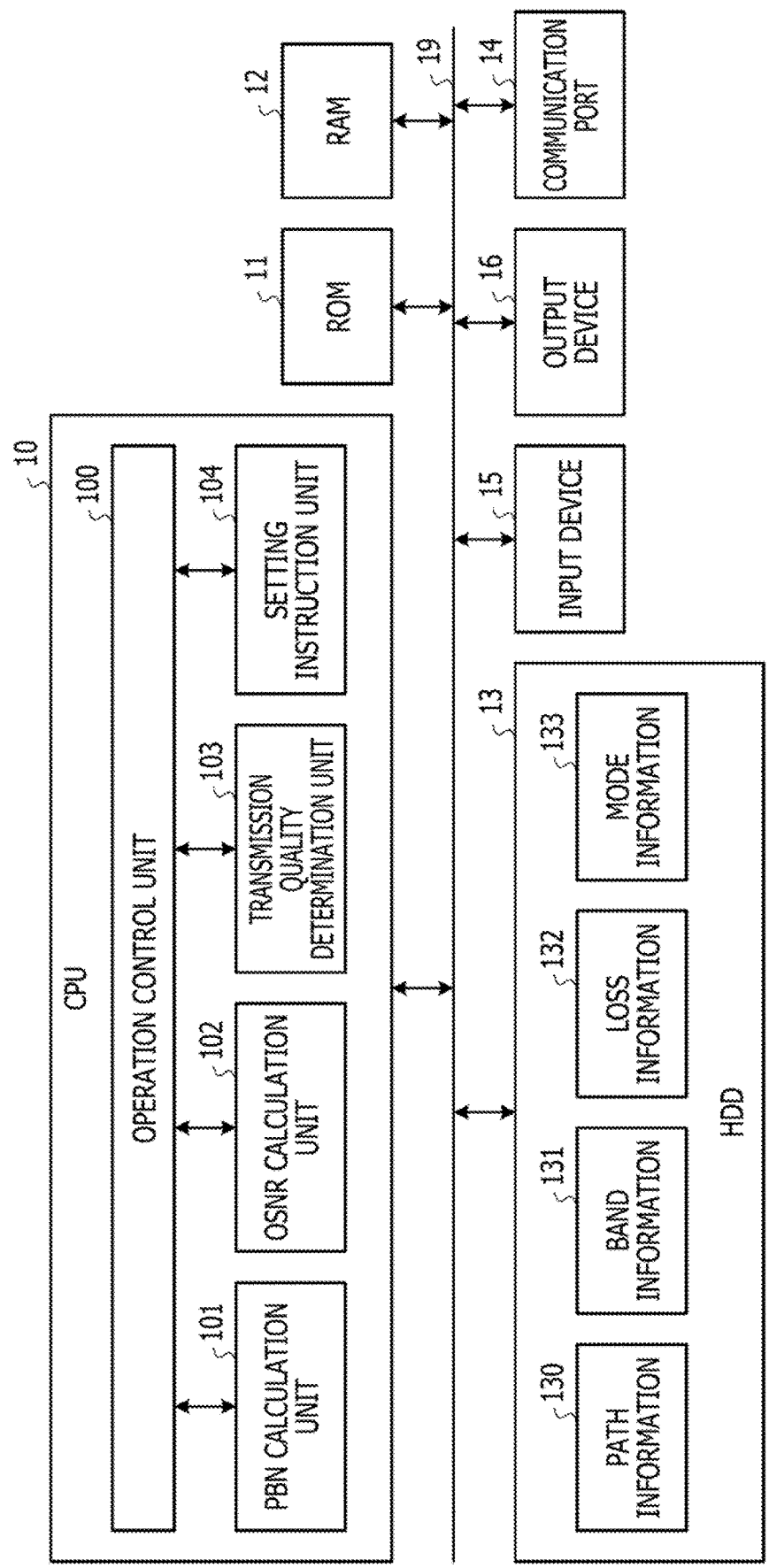
FIG. 5 is a configuration diagram illustrating a network management device of a first example.

FIG. 5 is a configuration diagram illustrating the network management device 1 of the first example. The network management device 1 includes a CPU 10, a read-only memory (ROM) 11, a random-access memory (RAM) 12, a hard disk drive (HDD) 13, a communication port 14, an input device 15, and an output device 16. The CPU 10 is coupled to the ROM 11, the RAM 12, the HDD 13, the communication port 14, the input device 15, and the output device 16 via a bus 19 so that signals may be input and output to and from each other.

The ROM 11 stores a program that drives the CPU 10. The RAM 12 functions as a working memory of the CPU 10. The communication port 14 is, for example, a wireless local area network (LAN) card or network interface card (NIC), and processes communication of the CPU 10 with the device control units 200, 210, 220, 300, and 310 of the respective transmission devices 20 to 22, the transmission-side TP 30, and the reception-side TP 31.

The input device 15 is a device for inputting information to the CPU 10. Examples of the input device 15 include a keyboard, a mouse, and a touch panel. The input device 15 outputs the input information to the CPU 10 via the bus 19.

The output device 16 is a device for outputting information from the CPU 10. Examples of the output device 16 include a display and a touch panel. The output device 16 acquires information from the CPU 10 via the bus 9 and outputs the information.

When the program is read from the ROM 11, the CPU 10 generates an operation control unit 100, a PBN calculation unit 101, an OSNR calculation unit 102, a transmission quality determination unit 103, and a setting instruction unit 104 as functions. The operation control unit 100, the PBN calculation unit 101, the OSNR calculation unit 102, the transmission quality determination unit 103, and the setting instruction unit 104 are not limited to functions of software, and may be formed by a circuit such as an FPGA or an ASIC which is used instead of the functions of software or together with the functions of software.

The operation control unit 100 controls the overall operation of the network management device 1. The operation control unit 100 instructs the PBN calculation unit 101, the OSNR calculation unit 102, the transmission quality determination unit 103, and the setting instruction unit 104 to operate according to an algorithm of the program of the ROM 11. The PBN calculation unit 101, the OSNR calculation unit 102, the transmission quality determination unit 103, and the setting instruction unit 104 operate according to the instruction of the operation control unit 100. In this case, various variables demanded for the operation are added to the operation of instruction.

In the HDD 13, path information 130, band information 131, loss information 132, and mode information 133 are stored. The path information 130, the band information 131, the loss information 132, and the mode information 133 are stored in the HDD 13 from the input device 15 via the operation control unit 100 in response to a user's operation, for example. A storage unit for the path information 130, the band information 131, the loss information 132, and the mode information 133 is not limited to the HDD 13, and may be another storage unit such as a memory.

The PBN calculation unit 101 refers to the path information 130 and the band information 131 to calculate the bandwidth of the optical signal according to the narrowing due to the WSS 4 over the path of the optical signal of the predetermined channel. The PBN calculation unit 101 is an example of a band calculation unit.

The OSNR calculation unit 102 refers to the path information 130 and the loss information 132 to calculate the OSNR of the optical signal based on the power loss due to the WSS 4 over the path of the optical signal of the predetermined channel.

The transmission quality determination unit 103 determines whether or not the bandwidth calculated by the PBN calculation unit 101 and the OSNR calculated by the OSNR calculation unit 102 satisfy a condition of the transmission quality of the optical signal indicated by the mode information 133. For example, the transmission quality determination unit 103 makes a determination using the condition of the transmission quality according to a mode of an optical signal of a predetermined channel, for example, a combination of the multilevel degree of modulation and the baud rate.

The setting instruction unit 104 decides whether or not to perform the mirror setting for the HISS 4 based on the determination result of the transmission quality determination unit 103. For example, when only the OSNR of the OSNR and the bandwidth when the mirror setting is not performed does not satisfy the condition of the transmission quality, the setting instruction unit 104 decides to perform the mirror setting when the OSNR and the bandwidth in a case where the mirror setting is performed respectively satisfies the condition of the transmission quality.

When the OSNR and the bandwidth in a case where the transmission band of the optical signal of the predetermined channel is not widened respectively satisfies the condition of the transmission quality, the setting instruction unit 104 decides not to perform the mirror setting. The setting instruction unit 104 decides to set the mode when the OSNR and the bandwidth respectively satisfies the condition of the transmission quality in the optical signal of a predetermined channel. The setting instruction unit 104 is an example of a decision processing unit.

Figure 6:
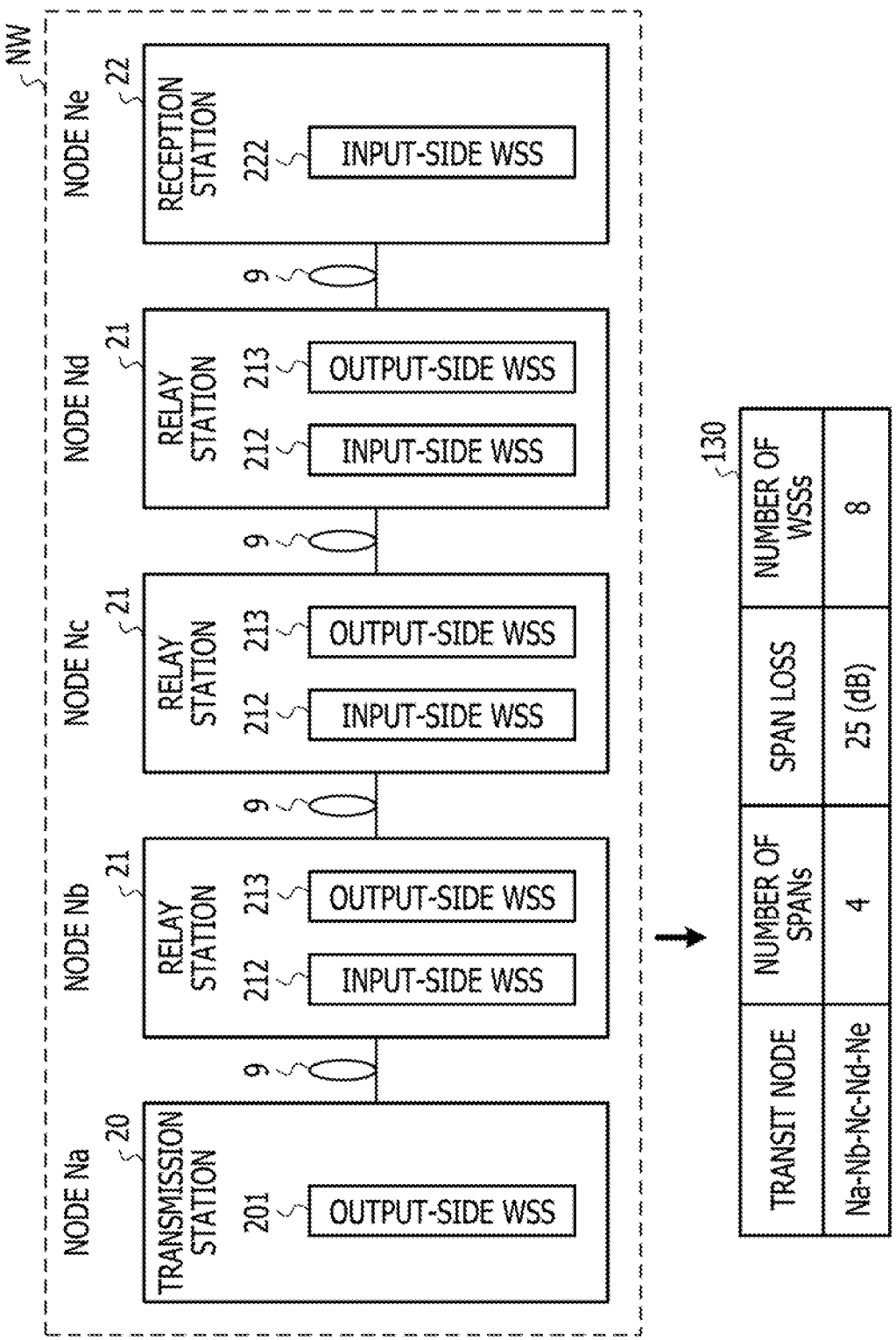
FIG. 6 is a diagram illustrating an example of path information.

FIG. 6 is a diagram illustrating an example of the path information 130. For example, the optical signal passes through nodes Na to Ne in the network NW in this order. The node Na is provided with the transmission device 20 of the transmission station, the nodes Nb to Nd are provided with the transmission device 21 of the relay station, and the node Ne is provided with the transmission device 22 of the reception station.

The path information 130 includes transit nodes, the number of spans, span loss, and the number of the WSSs. Since the nodes through which the optical signal passes in the network NW are the nodes Na to Ne, the transit node is set as "Na-Nb-Nc-Nd-Ne". Since the number of spans in which the optical signal passes, for example, the number of transmission sections, is 4, the number of spans is set to 4.

The span loss is set to, for example, 25 (dB) based on loss of the transmission path 9, Since the number of the WSSs 4 (input-side WSSs 212 and 222 and output-side WSSs 201 and 213) through which the optical signal passes is 8, the number of the WSSs is set to 8.

Figure 7:
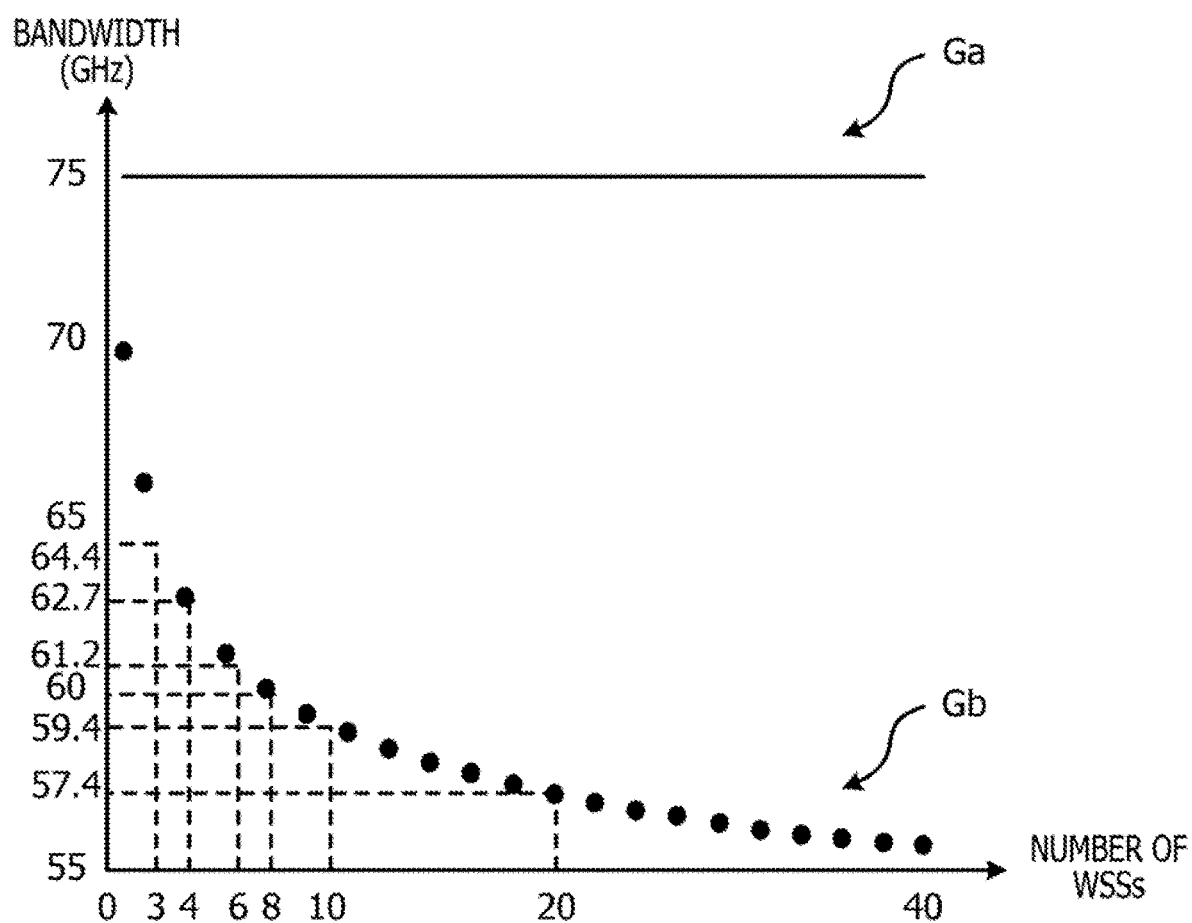
FIG. 7 is a diagram illustrating an example of band information.

FIG. 7 is a diagram illustrating an example of the band information 131. The horizontal axis represents the number of the WSSs 4 through which the optical signal passes, and the vertical axis represents the bandwidth (GHz) of the optical signal according to the narrowing due to the mirror array 44 of the WSS 4.

Reference symbol Ga indicates the bandwidth when the mirror setting is performed, and reference symbol Gb indicates the bandwidth when the mirror setting is not performed. The bandwidth is, for example, a value calculated with an interval between optical signals of adjacent channels, for example, a grid set to 75 (GHz).

When the mirror setting is performed, since the transmission band of the optical signal in the WSS 4 is widened, the bandwidth of the optical signal becomes ideal 75 (GHz) regardless of the number of the WSSs. When the mirror setting is not performed, the bandwidth decreases quadratically as the number of the WSSs increases.

In this way, the band information 131 indicates a correspondence relationship between the number of the WSSs and the bandwidth. The correspondence relationship between the number of the WSSs and the bandwidth is obtained, for example, from a simulation result.

The PBN calculation unit 101 calculates the bandwidth corresponding to the number of the WSSs of the path information 130. For example, when the number of the WSSs is 8, the PBN calculation unit 101 calculates the bandwidth when the mirror setting is not performed as 60 (GHz) and calculates the bandwidth when the mirror setting is performed as 75 (GHz). In the following example, all WSSs 4 on the optical signal path are targets of the mirror setting, but only some WSSs 4 may be the targets of the mirror setting as described later.

Figure 8:
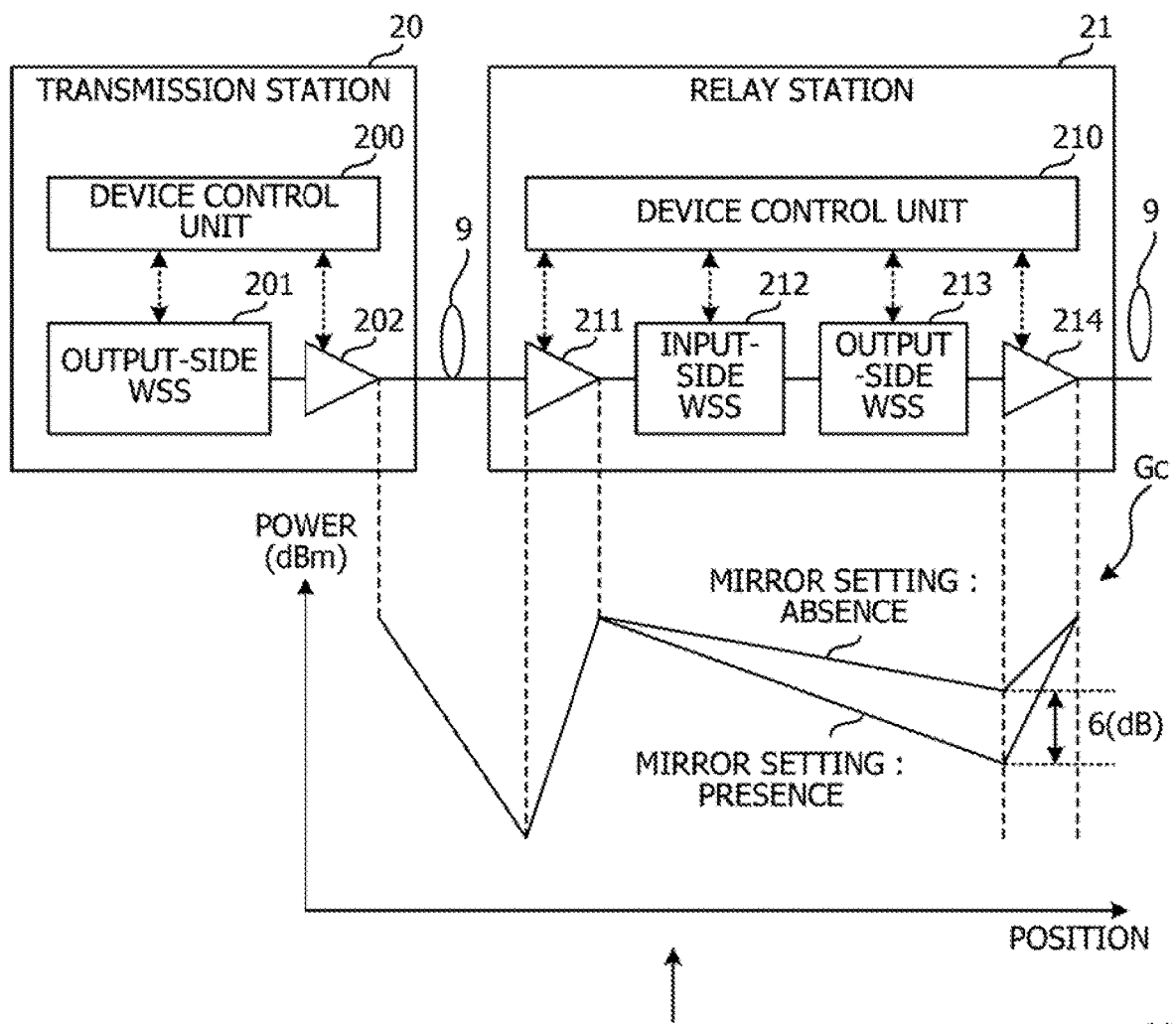
FIG. 8 is a diagram illustrating an example of calculation processing of loss information and OSNR.

FIG. 8 is a diagram illustrating an example of calculation processing of the loss information 132 and the OSNR. The loss information 132 includes post-amplifier output, pre-amplifier output, pre-amplifier noise figure (NF), WSS loss, and post-amplifier NF.

The post-amplifier output is the power of the optical signal output from the post-amplifiers 202 and 214. The pre-amplifier output is the power of the optical signal output from the pre-amplifiers 211 and 221. The pre-amplifier NF is the NF of the pre-amplifiers 211 and 221. The post-amplifier NF is the NF of the post-amplifiers 202 and 214.

The WSS loss is loss of the power of the optical signal of the WSS 4 (input-side WSSs 212 and 222 and output-side WSSs 201 and 213). The WSS loss has a value when the mirror setting is performed (referred to as "presence of mirror setting") and a value when the mirror setting is not performed (referred to as "absence of mirror setting"). The WSS loss of the presence of mirror setting is larger than the WSS loss of the absence of mirror setting by, for example, 3 (dB).

Reference symbol Gc exemplifies a change in power of the optical signal with respect to a position between the transmission device 20 of the transmission station and the transmission device 21 of the adjacent relay station. The power of the optical signal output from the post-amplifier 202 decreases due to the span loss of the transmission path 9, but increases due to amplification of the pre-amplifier 211.

The power of the optical signal output from the pre-amplifier 211 decreases due to the WSS loss of the input-side WSS 212 and the output-side WSS 213. In this case, the power of the optical signal is 6 (dB) higher in the case of the presence of mirror setting than in the case of the absence of mirror setting. The WSS loss of the presence of mirror setting is, for example, 11 (dB), and the WSS loss of the absence of mirror setting is, for example, 8 (dB).

For example, the post-amplifier output and the pre-amplifier output are +2 (dBm), the pre-amplifier NF is 5.5 (dB), and the post-amplifier NE is 5.9 (dB).

$$\text{SpanOSNR} = -10 \times \log_{10}(10^{-PostOSNR/10} + 10^{-PreOSNR/10}) \quad (1)$$

The OSNR calculation unit 102 calculates the OSNR in the case of the absence of mirror setting and the OSNR in the case of the presence of mirror setting from the respective values of the span loss of the path information 130 and the loss information 132. The OSNR calculation unit 102 calculates the OSNR per span (SpanOSNR) from Expression (1). In Expression (1), PostOSNR is the OSNR of the post-amplifiers 202 and 214, and PreOSNR is the OSNR of the pre-amplifiers 211 and 221.

When the span loss of the path information 130 is 25 (dB), the OSNR calculation unit 102 calculates the PostOSNR and the PreOSNR from the loss information 132. In the case of the absence of mirror setting, the PostOSNR is 38 (dB) and the PreOSNR is 29.4 (dB). For that reason, the SpanOSNR in the case of the absence of mirror setting is calculated as 28.8 (dB) from Expression (1).

In the case of the presence of mirror setting, the PostOSNR is 32 (dB) and the PreOSNR is 29.4 (dB). For that reason, the SpanOSNR in the case of the presence of mirror setting is calculated as 27.5 (dB) from Expression (1).

In this way, since the WSS loss in the case of the presence of mirror setting is larger than the WSS loss in the case of the absence of mirror setting by 6 (dB), the PostOSNR of the post-amplifier 214 in the case of the presence of mirror setting is larger than the PostOSNR of the post-amplifier 214 the case of the absence of mirror setting by 6 (dB). Accordingly, the SpanOSNR in the case of the presence of mirror setting is reduced by 1.3 (dB) from the SpanOSNR in the case of the absence of mirror setting.

The OSNR calculation unit 102 calculates the OSNR of the entire path from the number of spans of the path information 130 and the SpanOSNR. Since the number of spans is 4, the OSNR for 4 spans is smaller than the SpanOSNR per span by 6 (dB) (=10×$\log_{10}$4).

Accordingly, the OSNR in the case of the presence of mirror setting is calculated as 22.8 (dB), and the OSNR in the case of the absence of mirror setting is calculated as 21.5 (dB).

FIG. 9 is a diagram illustrating an example of the mode information 133. The mode information 133 includes a mode ID, multilevel degree, baud rate, OSNR tolerance, and PBN tolerance. The mode ID is an identifier of the mode of the optical signal. The multilevel degree is the multilevel degree of multilevel modulation used for the optical signal.

The OSNR tolerance is the lower limit value of the OSNR for the optical signal to satisfy predetermined transmission quality, and the PBN tolerance is the lower limit value of the bandwidth for the optical signal to satisfy the predetermined transmission quality. The OSNR tolerance and the PBN tolerance are, for example, values at which an error rate of the optical signal becomes equal to or lower than a predetermined threshold value. The OSNR tolerance and the PBN tolerance are examples of the condition of the transmission quality of an optical signal of a predetermined channel.

The mode information 133 of this example is an example when 400 (Gbps) is requested as a transmission capacity of the optical signal of the predetermined channel. In the mode #1, quadrature amplitude modulation (QAM) is 16-QAM with a multilevel degree of 16, and a baud rate is 64 (Gbaud). In the mode #2, QAM is 32-QAM with the multilevel degree of 32, and the baud rate is 55 (Gbaud). Since the baud rate is the bandwidth of the optical signal, the baud rate coincides with the PBN tolerance.

Figure 10:
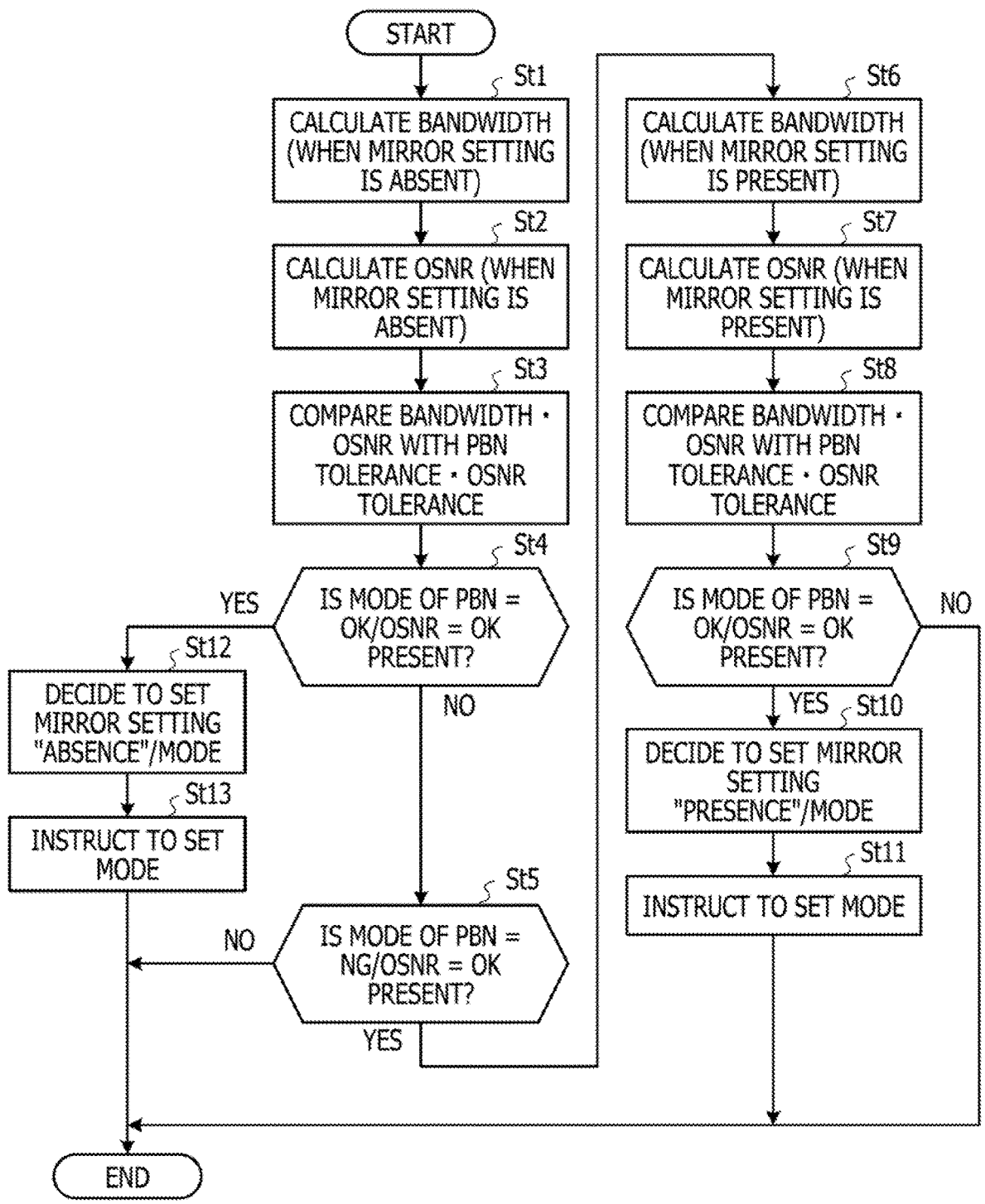
FIG. 10 is a flowchart illustrating an example of an operation of the network management device of the first example.

FIG. 10 is a flowchart illustrating an example of the operation of the network management device 1 of the first example. The PBN calculation unit 101 calculates the bandwidth in the case of the absence of mirror setting based over the path information 130 and the band information 131 (step St1). Next, the OSNR calculation unit 102 calculates the OSNR in the case of the absence of mirror setting based on the path information 130 and the loss information 132 (step St2).

Next, the transmission quality determination unit 103 compares the bandwidth and the OSNR with the PBN tolerance and the OSNR tolerance of the mode information 133, respectively (step St3). Next, the transmission quality determination unit 103 determines whether or not a mode, in which the bandwidth and the OSNR satisfy conditions of the PBN tolerance and the OSNR tolerance ("OK"), is present among the modes #1 and #2 of the mode information 133, (step St4).

In this case, the transmission quality determination unit 103 determines ("OK") that the condition of the PBN tolerance is satisfied when the bandwidth is equal to or larger the PBN tolerance, and determines ("NG") that the condition of the PBN tolerance is not satisfied when the bandwidth is smaller than the PBN tolerance. The transmission quality determination unit 103 determines ("OK") that the condition of the OSNR tolerance is satisfied when the OSNR is equal to or larger than the OSNR tolerance, and determines ("NG") that the condition of the OSNR tolerance is not satisfied when the OSNR is smaller than the OSNR tolerance.

When it is determined that the mode in which the bandwidth and the OSNR satisfy the conditions of the PBN tolerance and the OSNR tolerance, respectively, is present (Yes in step St4), the setting instruction unit 104 decides to set that mode as the mode of the optical signal in the transmission-side TP 30 and the reception-side TP 31, and not to perform mirror setting for the MSS 4 (mirror setting "absence") (step St12). Next, the setting instruction unit 104 instructs the transmission-side TP 30 and the reception-side TP 31 to set the mode (step St13).

When it is determined that the mode in which the bandwidth and the OSNR satisfy the conditions of the PBN tolerance and the OSNR tolerance, respectively, is absent (No in Step St4), the transmission quality determination unit 103 determines whether or not a mode, in which the bandwidth does not satisfy the condition of the PBN tolerance ("NG") and the OSNR satisfies the condition of the OSNR tolerance ("OK"), is present among the modes #1 and #2 (step St5). When it is determined that the mode in which the bandwidth does not satisfy the condition of the PBN tolerance and the OSNR satisfies the condition of the OSNR tolerance (No in Step St5) is absent, the operation control unit 100 determines that the mode in which transmission is possible is absent, and ends the process.

When it is determined that the mode in which the bandwidth does not satisfy the condition of the PBN tolerance and the OSNR satisfies the condition of the OSNR tolerance is present (Yes in Step St5), the PBN calculation unit 101 calculates the bandwidth in the case of the presence of mirror setting based over the path information 130 and the band information 131 (step St6). Next, the OSNR calculation unit 102 calculates the OSNR in the case of the presence of mirror setting based over the path information 130 and the loss information 132 (step St7).

Next, the transmission quality determination unit 103 compares the bandwidth and the OSNR in the case of the presence of mirror setting with the PBN tolerance and the OSNR tolerance of the mode information 133, respectively (step St8). Next, the transmission quality determination unit 103 determines whether or not the mode, in which the bandwidth and the OSNR satisfy the conditions of the PBN tolerance and the OSNR tolerance ("OK") in the case of the presence of mirror setting, respectively, is present among the modes #1 and #2 of the mode information 133 (step St9).

When it is determined that the mode in which the bandwidth and the OSNR satisfy the conditions of the PBN tolerance and the OSNR tolerance, respectively, is absent (No in Step St9), the operation control unit 100 determines that the mode in which transmission is possible is absent, and ends the process.

When it is determined that the mode in which the bandwidth and the OSNR satisfy the conditions of the PBN tolerance and the OSNR tolerance, respectively, is present (Yes in Step St9), the setting instruction unit 104 decides to set that mode as the mode of the optical signal in the transmission-side TP 30 and the reception-side TP 31, and to perform mirror setting for the WSS 4 (mirror setting "presence") (step St10).

Next, the setting instruction unit 104 instructs the transmission-side TP 30 and the reception-side TP 31 to set the mode, and instructs each WSS 4 to perform the mirror setting (step St11). In this case, the device control unit 300 of the transmission-side TP 30 sets the mode in the transmitter 301 according to the mode instruction and the device control unit 310 of the reception-side TP 31 sets the mode in the receiver 311 according to the mode instruction. Each of the device control units 200, 210, and 220 of the transmission devices 20 to 22 sets the angle of each mirror 43 of the mirror array 44 according to the mirror setting instruction.

In this way, the network management device 1 operates. As described above, the setting instruction unit 104 decides whether or not to perform the mirror setting for the WSS 4, based on the determination result of the transmission quality determination unit 103.

Figure 11:
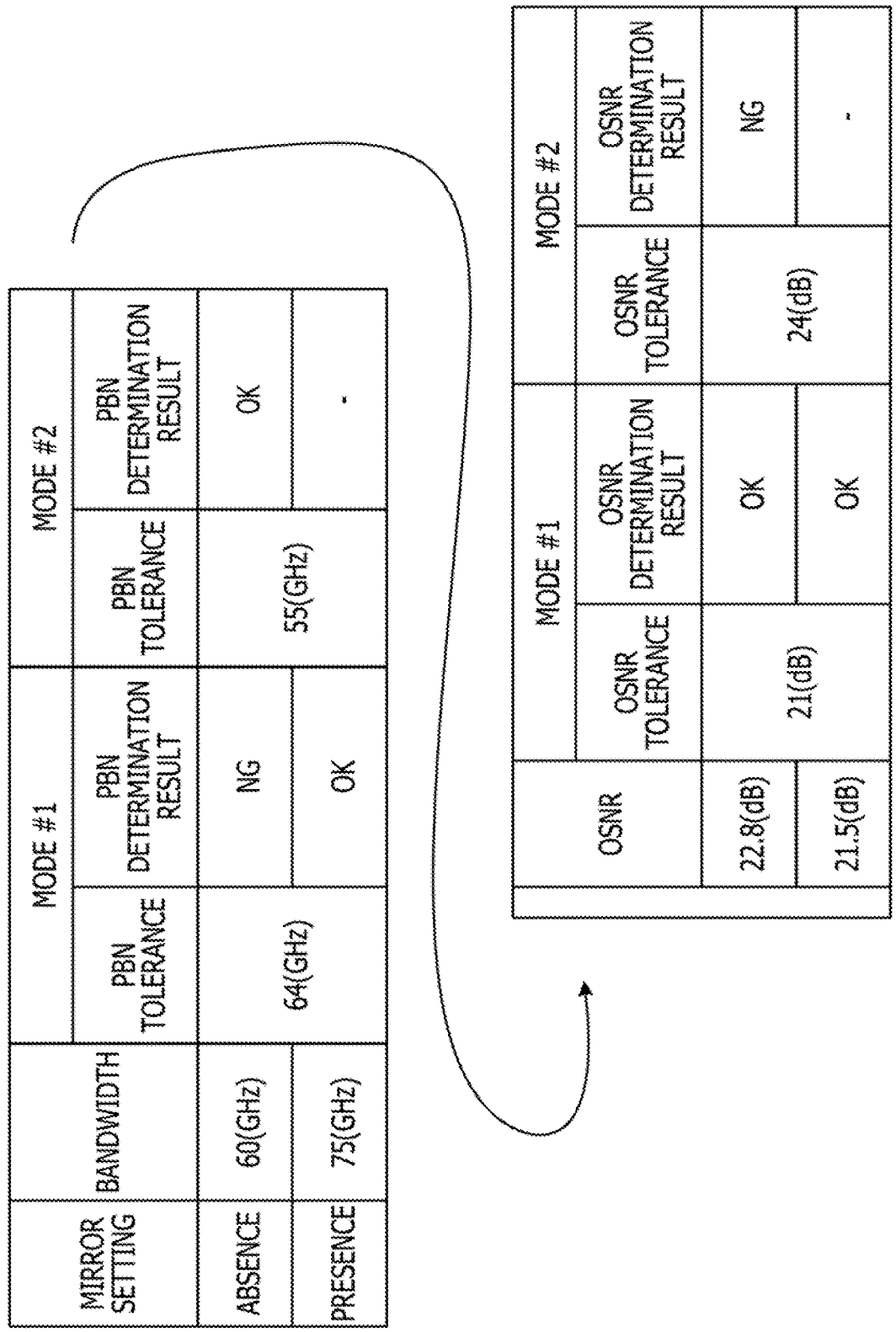
FIG. 11 is a diagram illustrating an example of determination contents when a mode in which conditions of PBN tolerance and OSNR tolerance are satisfied is present when the mirror setting is performed.

FIG. 11 is a diagram illustrating an example of determination contents when a mode, in which the conditions of the PBN tolerance and the OSNR tolerance are satisfied when the mirror setting is performed, is present. This example corresponds to the case where the determination result of the determination in step St9 is Yes.

The bandwidth of the optical signal when the mirror setting is not performed is 60 (GHz), which is smaller than the PBN tolerance of 64 (GHz) in the mode #1 and larger than the PBN tolerance of 55 (GHz) in the mode #2. Accordingly, in processing of step St3, the transmission quality determination unit 103 determines that the condition of the PBN tolerance in the mode #1 is not satisfied, but the condition of the PBN tolerance in the mode #2 is satisfied.

The OSNR of the optical signal when the mirror setting is not performed is 22.8 (dB), which is larger than the OSNR tolerance of 21 (dB) in the mode #1 and smaller than the OSNR tolerance of 24 (dB) in the mode #2. Accordingly, in the processing of step St3, the transmission quality determination unit 103 determines that the condition of the OSNR tolerance in the mode #1 is satisfied, but the condition of the OSNR tolerance in the mode #2 is not satisfied.

Accordingly, in both the modes #1 and #2, only one condition of the PBN tolerance and the OSNR tolerance is satisfied. For that reason, the transmission quality determination unit 103 determines that the determination result of the determination in step St4 is No.

However, in the mode #1, the condition of the PBN tolerance is not satisfied, but the condition of the OSNR tolerance is satisfied. For that reason, the transmission quality determination unit 103 determines that the determination result of the determination in step St5 is Yes. Therefore, the bandwidth and OSNR of the optical signal when the mirror setting is performed are calculated.

The bandwidth of the optical signal when the mirror setting is performed is 75 (GHz), which is larger than the PBN tolerance in the mode #1 of 64 (GHz). Accordingly, in processing of step St8, the transmission quality determination unit 103 determines that the condition of the PBN tolerance in the mode #1 is satisfied.

The OSNR of the optical signal when the mirror setting is performed is 21.5 (dB), which is larger than the OSNR tolerance of 21 (dB) in the mode #1. Accordingly, in the processing of step St8, the transmission quality determination unit 103 determines that the condition of the OSNR tolerance in the mode #1 is satisfied.

For that reason, the transmission quality determination unit 103 determines that the determination result of the determination in step St9 is Yes. Accordingly, in processing of step St10, the setting instruction unit 104 decides the mode of the optical signal to be the mode #1 and decides to perform the mirror setting for the WSS 4.

In this way, when the bandwidth of the OSNR and the bandwidth when the mirror setting is not performed does not satisfy the condition of the PBN tolerance, the setting instruction unit 104 decides to perform the mirror setting when the OSNR and the bandwidth when the mirror setting is performed respectively satisfies the conditions of the OSNR tolerance and the PBN tolerance, For that reason, the network management device 1 may apply the mirror setting to the WSS 4 when the transmission quality is not satisfied due to narrowing of the band.

The transmission quality determination unit 103 makes a determination using the conditions of the PBN tolerance and the OSNR tolerance according to the modes #1 and #2, each of which is a combination of the multilevel degree of modulation and the baud rate of the optical signals of a predetermined channel. The setting instruction unit 104 decides to set the mode #1 when the OSNR and the bandwidth respectively satisfies the conditions of the PBN tolerance and the OSNR tolerance in the optical signal.

Therefore, the network management device 1 may select the modes #1 and #2 that satisfy the transmission quality.

Next, the case where the OSNR and the bandwidth when the mirror setting is not performed respectively satisfies the OSNR tolerance and the PBN tolerance will be described.

Figure 12:
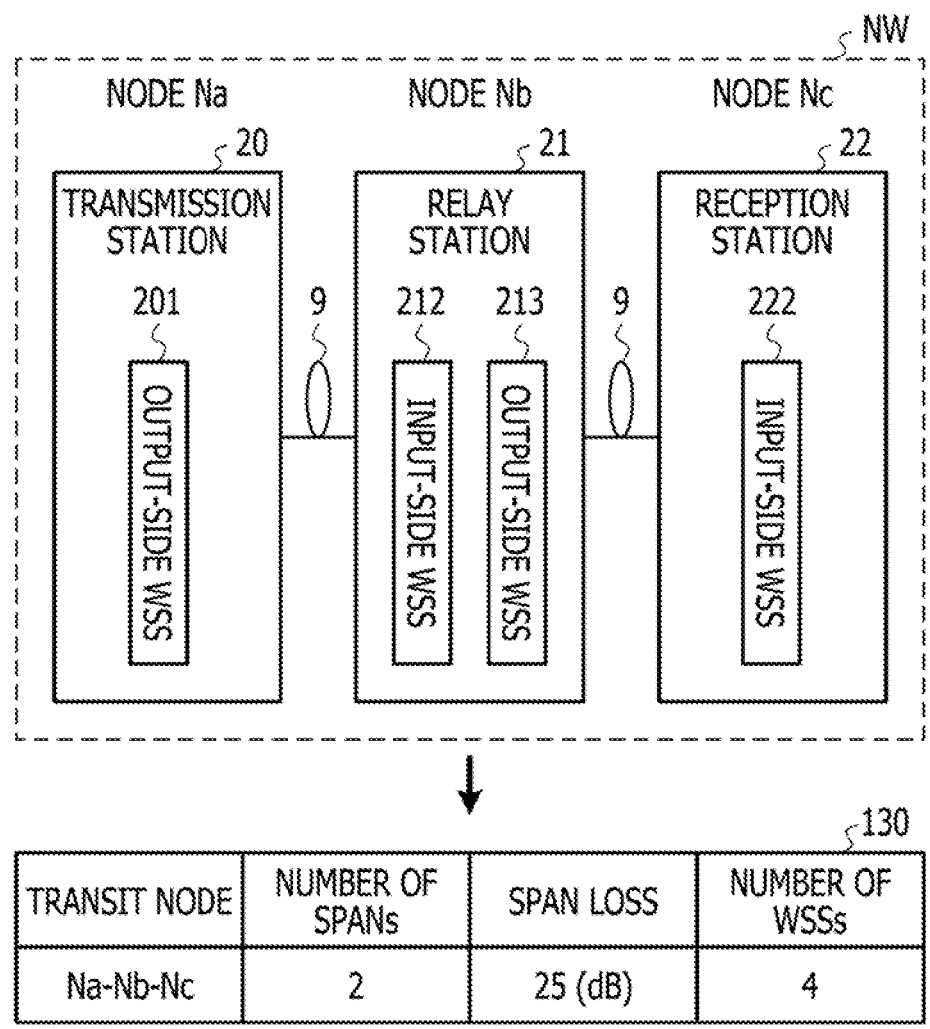
FIG. 12 is a diagram illustrating another example of path information.

FIG. 12 is a diagram illustrating another example of the path information 130. The optical signal path passes through the nodes Na to Nc in this order. The node Na is provided with the transmission device 20 of the transmission station, the node Nb is provided with the transmission device 21 of the relay station, and the node Nc is provided with the transmission device 22 of the reception station.

Therefore, in the path information 130, the transit node indicates "Na-Nb-Nc", the number of spans indicates 2, and the number of the WSSs indicates 4. The span loss indicates 25 (dB).

The PBN calculation unit 101 calculates the bandwidth from the path information 130 and the band information 131. The bandwidth when the number of the WSSs is 4 when the mirror setting is not performed is calculated as 62.7 (GHz), and the bandwidth when the number of the WSSs is 4 when the mirror setting is performed is calculated as 75 (GHz) (see FIG. 7).

The OSNR calculation unit 102 calculates the OSNR from the path information 130 and the loss information 132 by the method described with reference to FIG. 8. The OSNR when the mirror setting is not performed is calculated as 25.8 (dB), and the OSNR when the mirror setting is performed is calculated as 24.5 (dB).

Figure 13:
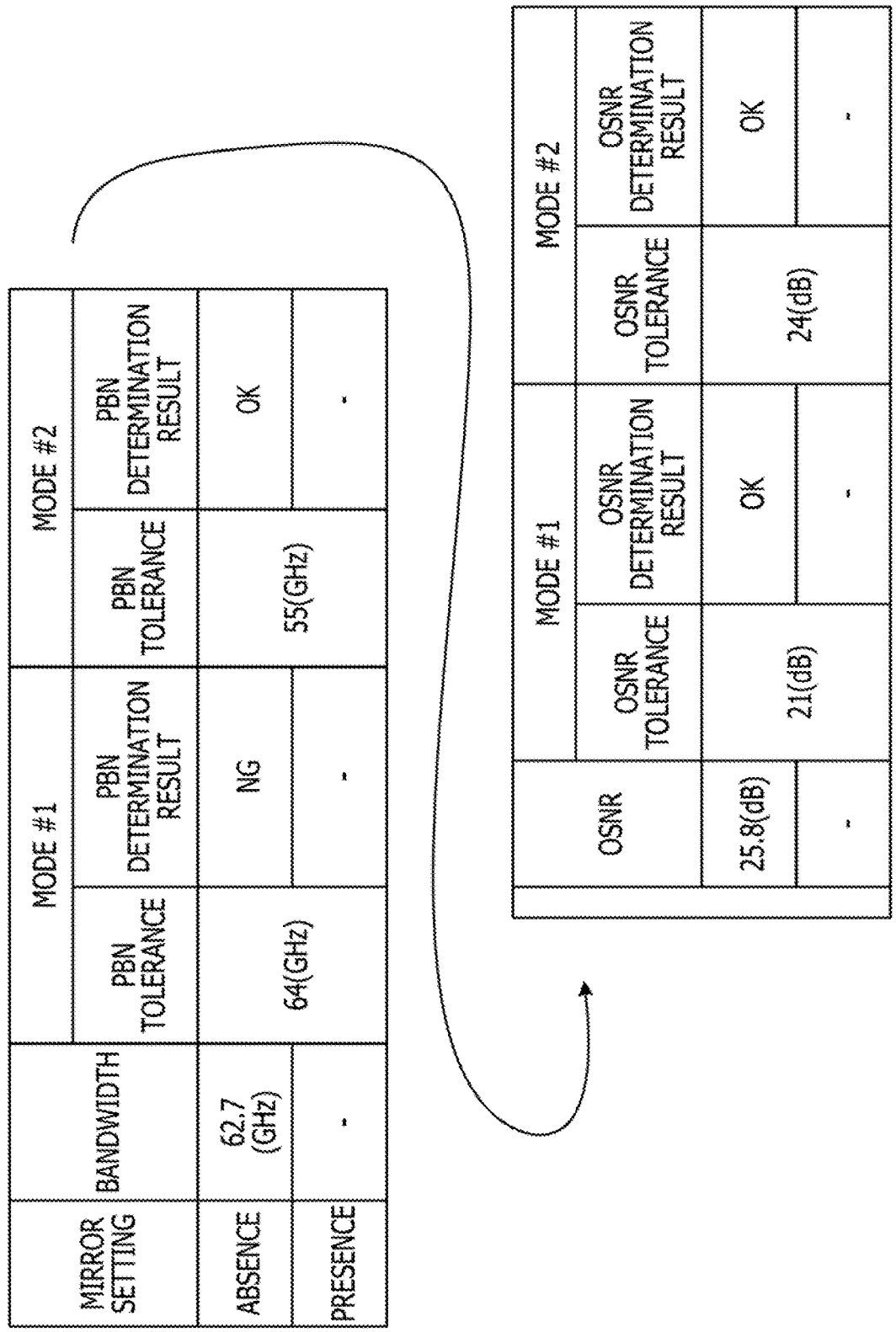
FIG. 13 is a diagram illustrating an example of determination contents when a mode in which the conditions of the PBN tolerance and the OSNR tolerance are satisfied is present when the mirror setting is not performed.

FIG. 13 is a diagram illustrating an example of determination contents when a mode in which the conditions of the PBN tolerance and the OSNR tolerance are satisfied is present when the mirror setting is not performed.

This example corresponds to the case where the determination result of the determination in step St4 is Yes.

The bandwidth of the optical signal when the mirror setting is not performed is 62.7 (GHz), which is smaller than the PBN tolerance of 64 (GHz) in the mode #1 and larger than the PBN tolerance of 55 (GHz) in the mode #2. Accordingly, in processing of step St3, the transmission quality determination unit 103 determines that the condition of the PBN tolerance in the mode #1 is not satisfied, but the condition of the PBN tolerance in the mode #2 is satisfied.

The OSNR of the optical signal when the mirror setting is not performed is 25.8 (dB), which is larger than the OSNR tolerance of 21 (dB) in the mode #1 and larger than the OSNR tolerance of 24 (dB) in the mode #2. Accordingly, in the processing of step St3, the transmission quality determination unit 103 determines that the conditions of the OSNR tolerance in the modes #1 and #2 are satisfied.

Accordingly, the conditions of the PBN tolerance and the OSNR tolerance in the mode #1 are satisfied. For that reason, the transmission quality determination unit 103 determines that the determination result of the determination in step St4 is Yes. Therefore, in processing of step St12, the setting instruction unit 104 decides the mode of the optical signal to be the mode #1 and decides not to perform the mirror setting for the WSS 4.

In this way, the setting instruction unit 104 decides not to perform the mirror setting when the OSNR and the bandwidth when the mirror setting is not performed respectively satisfies the conditions of the OSNR tolerance and the PBN tolerance. Therefore, it is suppressed that useless mirror setting is performed when the transmission quality is satisfied even if the mirror setting is not performed.

Next, an example in which the condition of the OSNR tolerance in each of the modes #1 and #2 when the mirror setting is not performed is not satisfied will be described.

Figure 14:
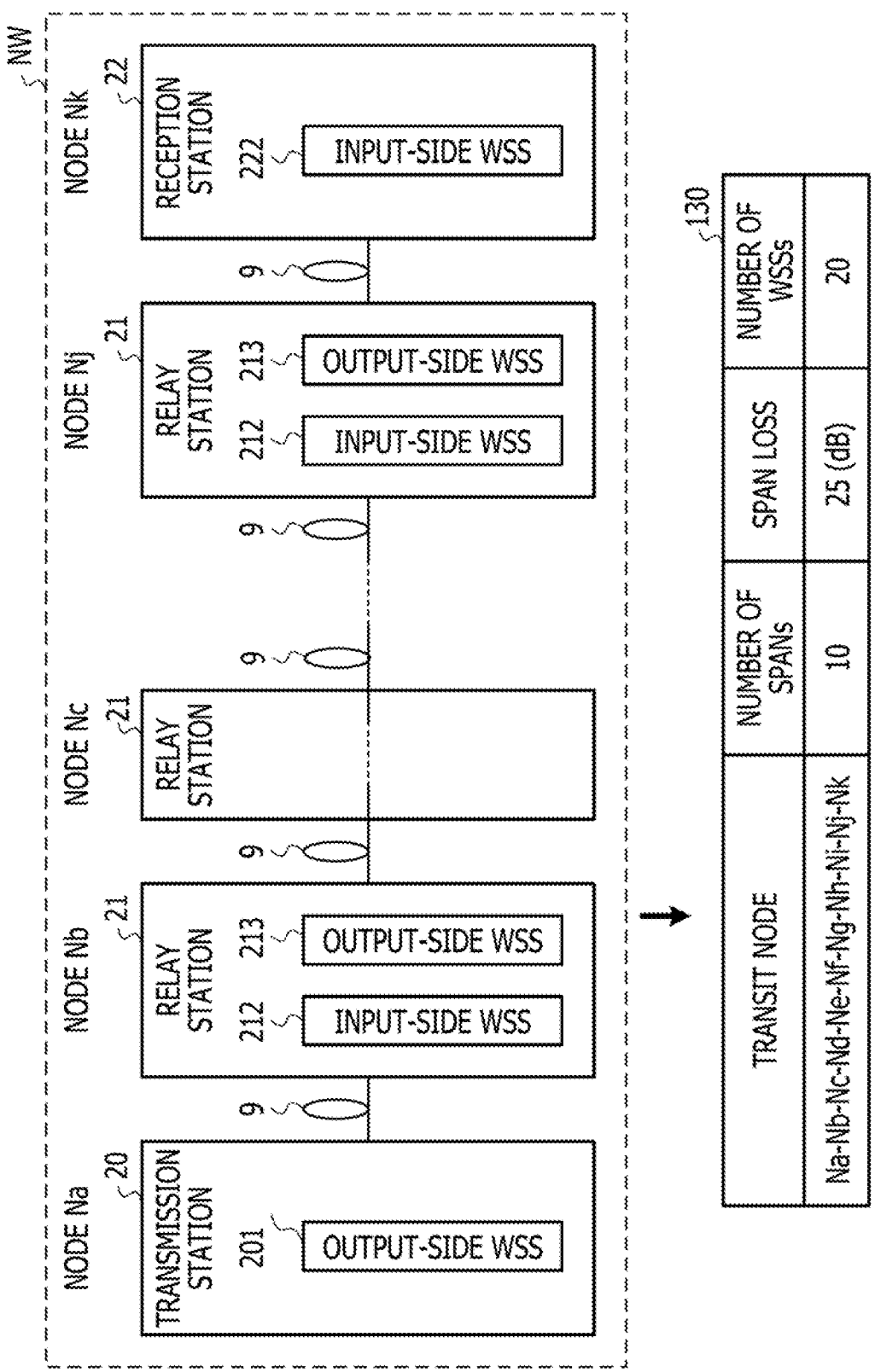
FIG. 14 is a diagram illustrating another example of path information.

FIG. 14 is a diagram illustrating another example of the path information 130. The optical signal path passes through the nodes Na to Nk in this order. The node Na is provided with the transmission device 20 of the transmission station, the nodes Nb to Nj are provided with the transmission device 21 of the relay station, and the node Nk is provided with the transmission device 22 of the reception station.

Therefore, in the path information 130, the transit node indicates "Na-Nb-Nc-Nd-Ne-Nf-Ng-Nh-Ni-Nj-Nk", the number of spans indicates 10, and the number of the WSSs indicates 20. The span loss indicates 25 (dB).

The PBN calculation unit 101 calculates the bandwidth from the path information 130 and the band information 131. The bandwidth when the number of the WSSs is 20 when the mirror setting is not performed is calculated as 57.4 (GHz), and the bandwidth when the number of the WSSs is 20 when the mirror setting is performed is calculated as 75 (GHz) (see FIG. 7).

The OSNR calculation unit 102 calculates the OSNR from the path information 130 and the loss information 132 by the method described with reference to FIG. 8. The OSNR when the mirror setting is not performed is calculated as 18.8 (dB), and the OSNR when the mirror setting is performed is calculated as 17.5 (dB).

Figure 15:
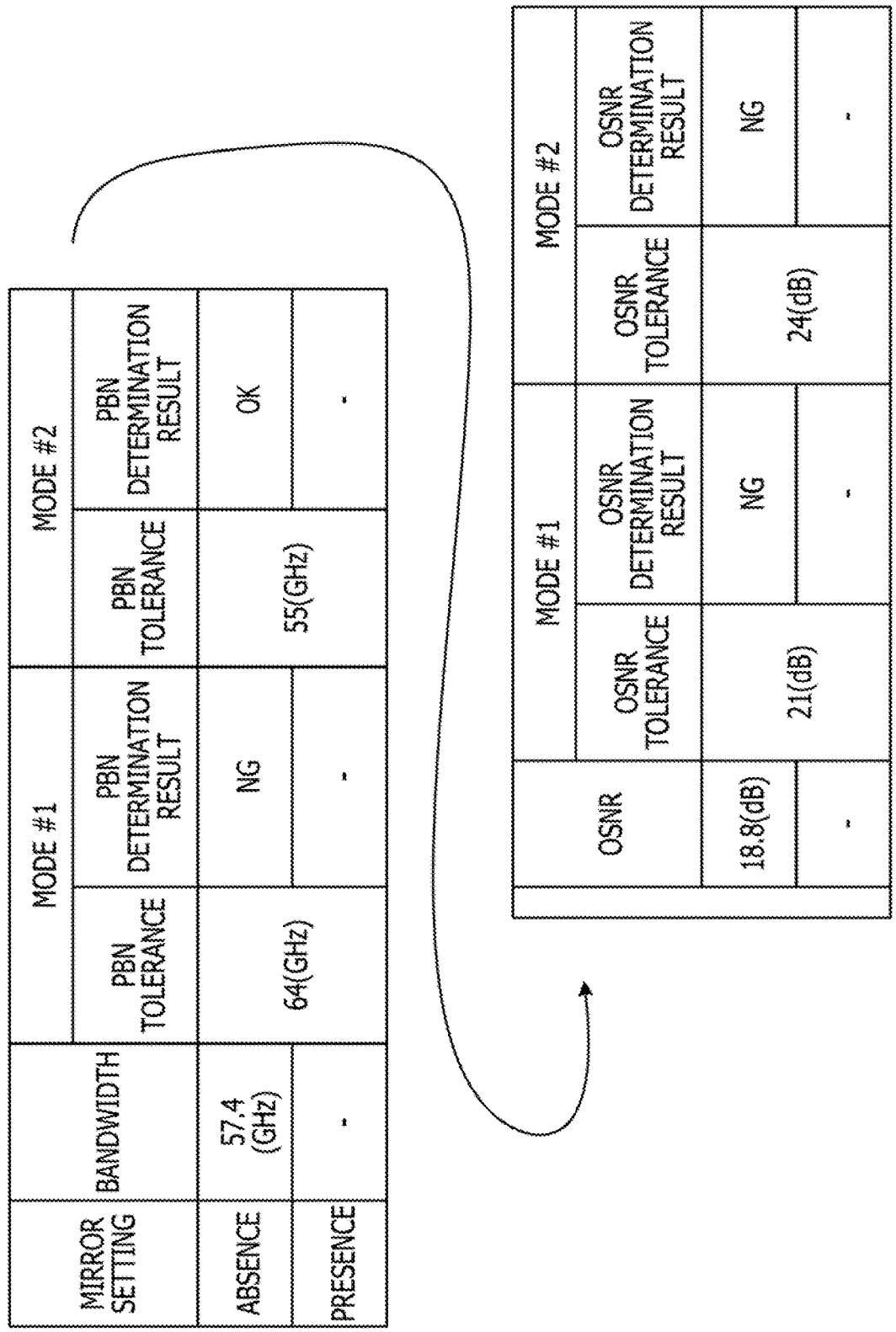
FIG. 15 is a diagram illustrating an example of determination contents when the mode in which the conditions of the PBN tolerance and the OSNR tolerance are satisfied is not absent when the mirror setting is not performed.

FIG. 15 is a diagram illustrating an example of determination contents when a mode in which the conditions of the PBN tolerance and the OSNR tolerance are satisfied is absent when the mirror setting is not performed. This example corresponds to the case where the determination result of the determination in step St5 is No.

The bandwidth of the optical signal when the mirror setting is not performed is 57.4 (GHz), which is smaller than the PBN tolerance of 64 (GHz) in the mode #1 and larger than the PBN tolerance of 55 (GHz) in the mode #2. Accordingly, in processing of step St3, the transmission quality determination unit 103 determines that the condition of the PBN tolerance in the mode #1 is not satisfied, but the condition of the PBN tolerance in the mode #2 is satisfied.

The OSNR of the optical signal when the mirror setting is not performed is 18.8 (dB), which is smaller than the OSNR tolerance of 21 (dB) in the mode #1 and smaller than the OSNR tolerance of 24 (dB) in the mode #2. Accordingly, in the processing of step St3, the transmission quality determination unit 103 determines that the conditions of the OSNR tolerance in the modes #1 and #2 are not satisfied.

Accordingly, neither of the modes #1 and #2 satisfies the condition of the OSNR tolerance. For that reason, the transmission quality determination unit 103 determines that the determination result of the determination in step St4 is No, and determines that the determination result of the determination in step St5 is No. Therefore, the network management device 1 determines that the optical signal may not be transmitted in any of the current the modes #1 and #2.

Next, an example in which the condition of the OSNR tolerance in the mode #1 when the mirror setting is not performed is not satisfied will be described.

Figure 16:
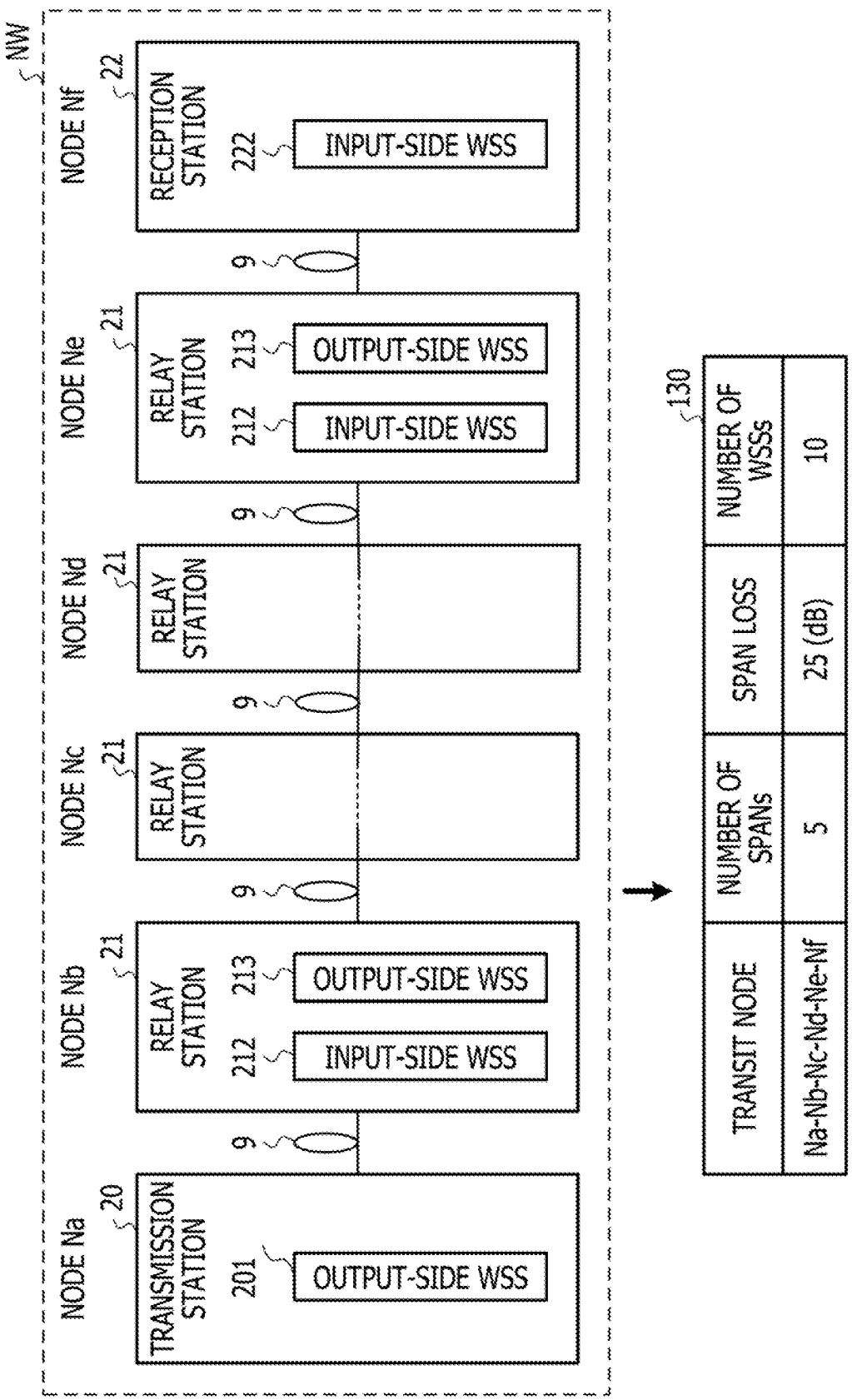
FIG. 16 is a diagram illustrating another example of path information.

FIG. 16 is a diagram illustrating another example of the path information 130. The optical signal path passes through the nodes Na to Nf in this order. The node Na is provided with the transmission device 20 of the transmission station, the nodes Nb to Ne are provided with the transmission device 21 of the relay station, and the node Nf is provided with the transmission device 22 of the reception station.

Therefore, in the path information 130, the transit node indicates "Na-Nb-Nc-Nd-Ne-Nf", the number of spans indicates 5, and the number of the WSSs indicates 10. The span loss indicates 25 (dB).

The PBN calculation unit 101 calculates the bandwidth from the path information 130 and the band information 131. The bandwidth when the number of the WSSs is 10 when the mirror setting is not performed is calculated as 59.4 (GHz), and the bandwidth when the number of the WSSs is 10 when the mirror setting is performed is calculated as 75 (GHz) (see FIG. 7).

The OSNR calculation unit 102 calculates the OSNR from the path information 130 and the loss information 132 by the method described with reference to FIG. 8. The OSNR when the mirror setting is not performed is calculated as 21.8 (dB), and the OSNR when the mirror setting is performed is calculated as 20.5 (dB).

Figure 17:
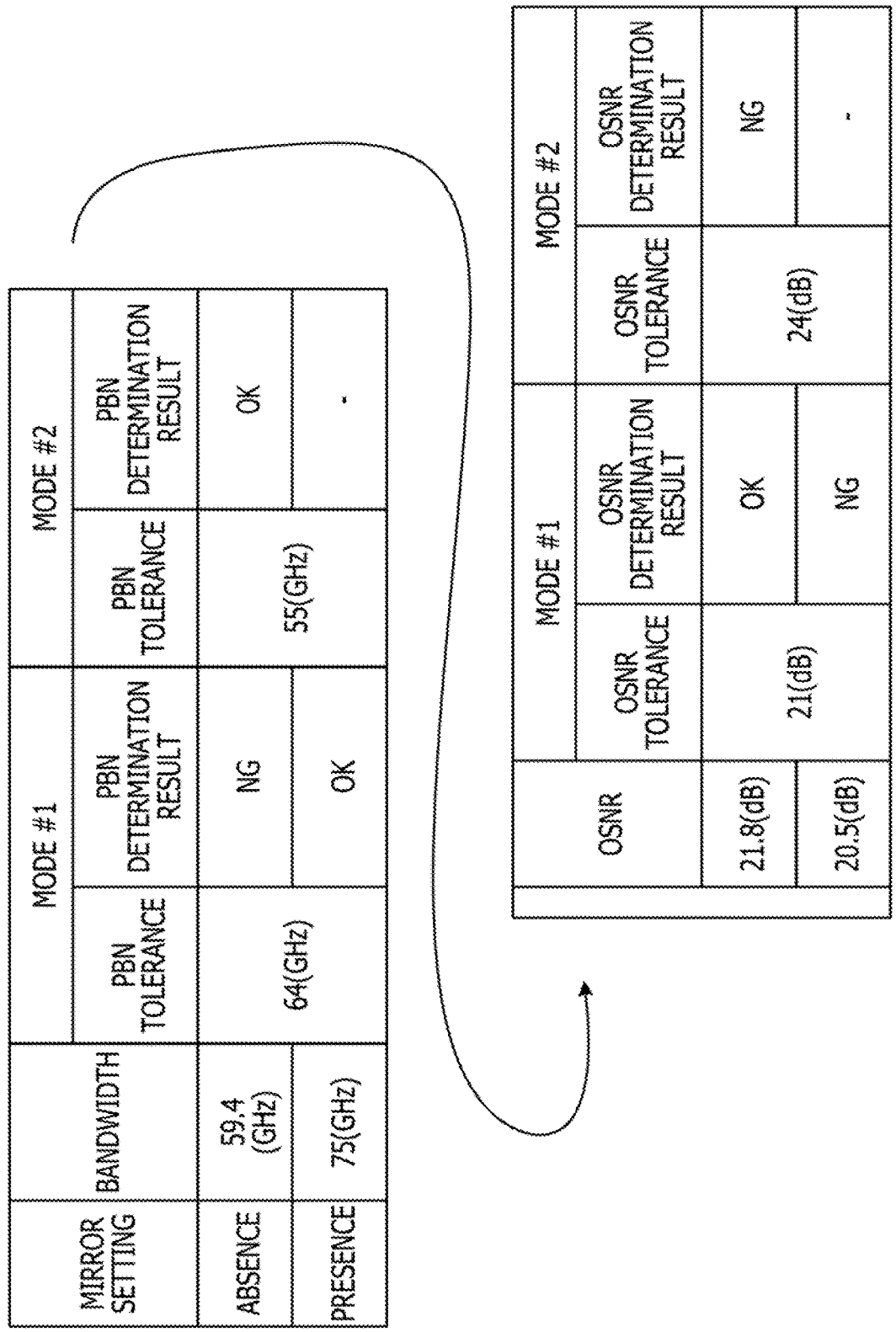
FIG. 17 is a diagram illustrating an example of determination contents when a mode in which the conditions of the OSNR tolerance is satisfied is present when the mirror setting is performed.

FIG. 17 is a diagram illustrating an example of determination contents when the mode in which the condition of the OSNR tolerance is satisfied is absent when the mirror setting is performed. This example corresponds to the case where the determination result of the determination in step St9 is No.

The bandwidth of the optical signal when the mirror setting is not performed is 59.4 (GHz), which is smaller than the PBN tolerance of 64 (GHz) in the mode #1 and larger than the PBN tolerance of 55 (GHz) in the mode #2. Accordingly, in processing of step St3, the transmission quality determination unit 103 determines that the condition of the PBN tolerance in the mode #1 is not satisfied, but the condition of the PBN tolerance in the mode #2 is satisfied.

The OSNR of the optical signal when the mirror setting is not performed is 21.8 (dB), which is larger than the OSNR tolerance of 21 (dB) in the mode #1 and smaller than the OSNR tolerance of 24 (dB) in the mode #2. Accordingly, in the processing of step St3, the transmission quality determination unit 103 determines that the condition of the OSNR tolerance in the mode #1 is satisfied, but the condition of the OSNR tolerance in the mode #2 is not satisfied.

Accordingly, in both the modes #1 and #2, only one condition of the PBN tolerance and the OSNR tolerance is satisfied. For that reason, the transmission quality determination unit 103 determines that the determination result of the determination in step St4 is No.

However, in the mode #1, the condition of the PBN tolerance is not satisfied, but the condition of the OSNR tolerance is satisfied. For that reason, the transmission quality determination unit 103 determines that the determination result of the determination in step St5 is Yes. Therefore, the bandwidth and OSNR of the optical signal when the mirror setting is performed are calculated.

The bandwidth of the optical signal when the mirror setting is performed is 75 (GHz), which is larger than the PBN tolerance in the mode #1 of 64 (GHz). Accordingly, in processing of step St8, the transmission quality determination unit 103 determines that the condition of the PBN tolerance in the mode #1 is satisfied.

The OSNR of the optical signal when the mirror setting is performed is 20.5 (dB), which is smaller than the OSNR tolerance of 21 (dB) in the mode #1. Accordingly, in the processing of step St8, the transmission quality determination unit 103 determines that the condition of the OSNR tolerance in the mode #1 is not satisfied.

For that reason, the transmission quality determination unit 103 determines that the determination result of the determination in step St9 is No. Accordingly, the network management device 1 determines that the optical signal may not be transmitted in any of the current the modes #1 and #2 even when the mirror setting is performed.

As described above, the transmission quality determination unit 103 determines whether or not the OSNR and the bandwidth satisfy the conditions of the OSNR tolerance and the PBN tolerance, respectively. The setting instruction unit 104 decides whether or not to perform the mirror setting for the WSS 4 based on the determination result of the transmission quality determination unit 103.

For that reason, the network management device 1 may predict the OSNR and the bandwidth and decide to perform the mirror setting when the OSNR tolerance and the PBN tolerance are satisfied. Accordingly, not only narrowing of the band due to performing the mirror setting is suppressed, but also the increase in loss accompanying the mirror setting and the decrease in OSNR are suppressed. Therefore, according to the network management device 1, both the OSNR of the optical signal and the pass band narrowing may be achieved.

As described with reference to FIG. 7, if the mirror setting is performed for the WSS 4, the bandwidth of the optical signal may be widened, and thus narrowing of the band is suppressed. For example, in the case of the mode #1, since the baud rate is 64 (Gbaud), when the mirror setting is not performed, the number of the WSSs corresponding to the bandwidth of 64 (GHz) is 3. For that reason, considering that the number of the WSSs of the transmission device 21 of the relay station is 2, the optical signal of the mode #1 may only be transmitted in one span.

However, when the mirror setting is performed on all WSSs 4 of each of the transmission device 20 to 22, since narrowing of the band is suppressed, the bandwidth of 75 (GHz) of the wavelength grid becomes possible and the constraint on the number of spans in which transmission is possible is relaxed.

The OSNR is affected by the span loss of the transmission path 9 because the OSNR depends on the power loss of the optical signal.

Figure 18:
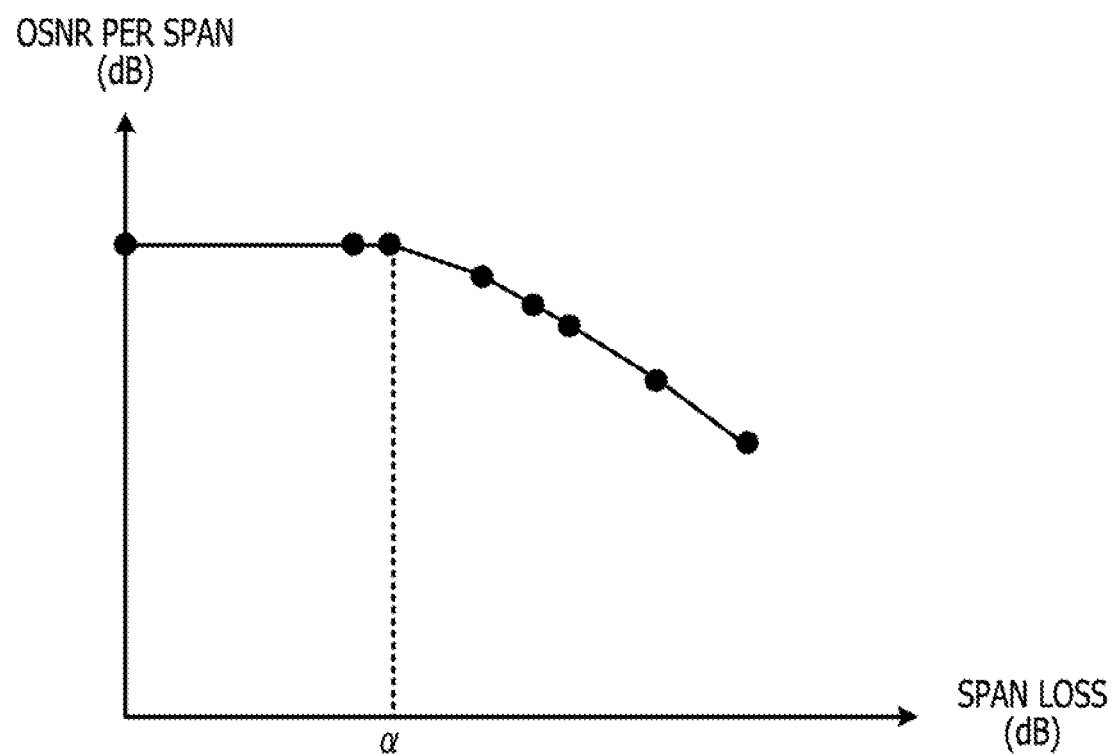
FIG. 18 is a diagram illustrating an example of changes in OSNR per span with respect to span loss.

FIG. 18 is a diagram illustrating an example of changes in OSNR per span with respect to span loss. The horizontal axis represents the span loss, and the vertical axis represents the OSNR per span. If the span loss exceeds a predetermined value α, the OSNR per span decreases as the span loss increases.

Figure 19:
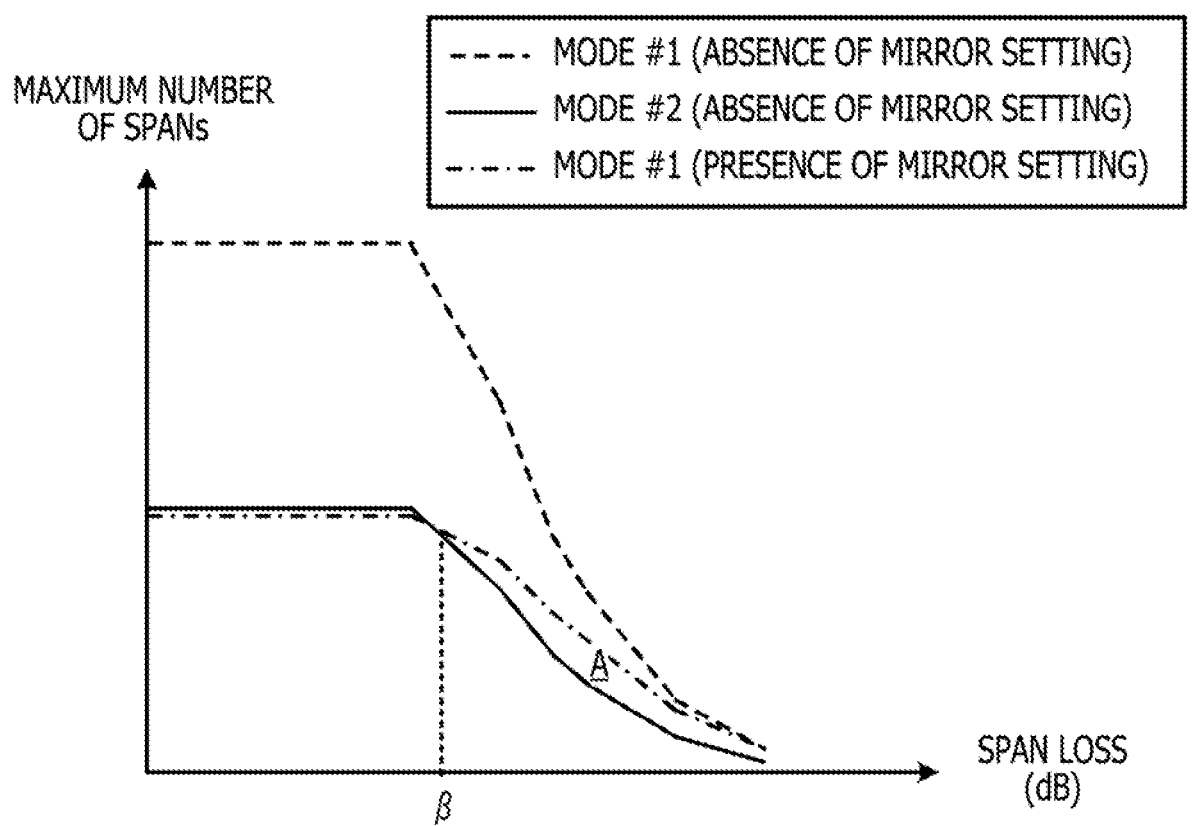
FIG. 19 is a diagram illustrating an example of changes in maximum number of spans in which transmission is possible with respect to span loss.

FIG. 19 is a diagram illustrating an example of changes in the maximum number of spans in which transmission is possible with respect to span loss. The horizontal axis illustrates the span loss, and the vertical axis illustrates the maximum number of spans. The maximum number of spans is calculated from the characteristics of FIG. 18 and the OSNR tolerance of each of the mode #1 and #2.

The dotted line represents the maximum number of spans of the optical signal in the mode #1 when the mirror setting is not performed, and the solid line represents the maximum number of spans of the optical signal in the mode #2 when the mirror setting is not performed. Since the OSNR tolerance in the mode #1 (21 (dB)) is larger than the OSNR tolerance in the mode #2 (24(dB)) by 3 (dB), the maximum number of spans in the mode #1 is twice the maximum number of spans in the mode #2.

The one-dot chain line represents the maximum number of spans of the optical signal in the mode #1 when the mirror setting is performed. When the mirror setting is performed on all the WSSs 4 of the each of the transmission devices 20 to 22, since the WSS loss of two WSSs 4 is added, the maximum number of spans in the mode #1 is significantly decreased.

However, when the span loss is equal to or greater than a predetermined value β, since the maximum number of spans of the optical signal in the mode #1 when the mirror setting is performed exceeds (see region A) the maximum number of spans of the optical signal in the mode #2 when mirror setting is not performed, the number of spans in which transmission is possible improved.

In the example described above, the setting instruction unit 104 sets all the WSSs 4 of each of the transmission devices 20 to 22 as the targets of the mirror setting, but may set only some of the WSSs 4 as the targets of the mirror setting.

Figure 20:
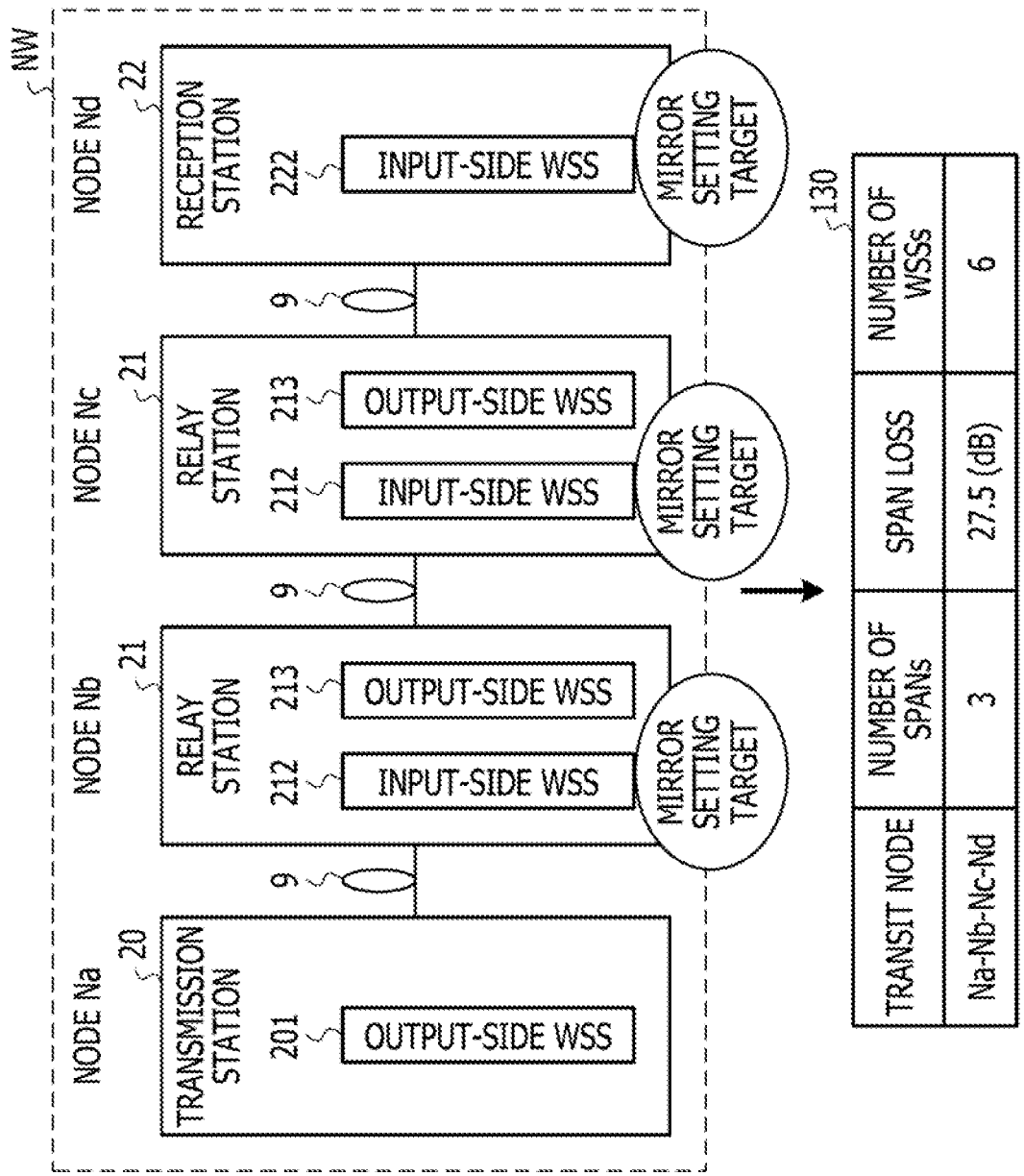
FIG. 20 is a diagram illustrating another example of path information.

FIG. 20 is a diagram illustrating another example of the path information 130. The optical signal path passes through the nodes Na to Nd in this order. The node Na is provided with the transmission device 20 of the transmission station, the nodes Nb and Nc are provided with the transmission device 21 of the relay station, and the node Nd is provided with the transmission device 22 of the reception station.

For that reason, in the path information 130, the transit node indicates "Na-Nb-Nc-Nd", the number of spans indicates 3, and the number of the WSSs indicates 6. The span loss indicates 27.5 (dB).

The setting instruction unit 104 sets only the input-side WSSs 212 and 222 as the targets of the mirror setting. For that reason, the PBN calculation unit 101 calculates the bandwidth (64.4 (GHz)), which corresponds to the number (3) of the input-side WSSs 212 and 222 that are the targets of the mirror setting, as the bandwidth when the mirror setting is performed (see FIG. 7). The setting instruction unit 104 may set, for example, only the output-side WSSs 201 and 213 as the targets of the mirror setting without being limited to the input-side WSSs 212 and 222.

The OSNR calculation unit 102 calculates the OSNR from the path information 130 and the loss information 132 by the method described with reference to FIG. 8. The OSNR when the mirror setting is not performed is calculated as 21.8 (dB), and the OSNR when the mirror setting is performed is calculated as 21.5 (dB).

Figure 21:
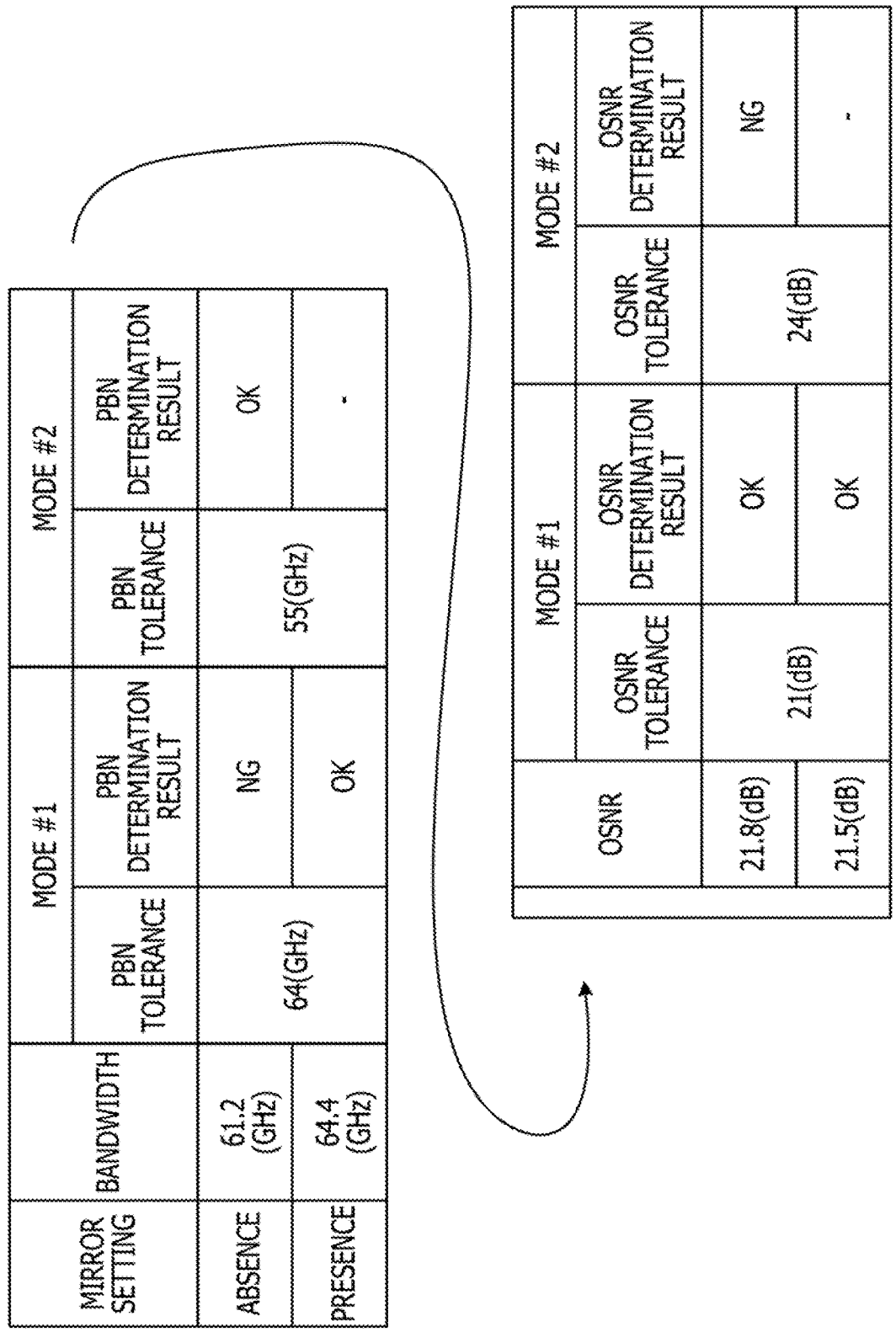
FIG. 21 is a diagram illustrating an example of determination contents of the conditions of PBN tolerance and OSNR tolerance when only some of WSSs are targets of the mirror setting.

FIG. 21 is a diagram illustrating an example of determination contents of the conditions of the PBN tolerance and the OSNR tolerance when only some of the WSSs 4 are targets of the mirror setting.

The bandwidth of the optical signal when the mirror setting is not performed is 61.2 (GHz), which is smaller than the PBN tolerance of 64 (GHz) in the mode #1 and larger than the PBN tolerance of 55 (GHz) in the mode #2. Accordingly, in processing of step St3, the transmission quality determination unit 103 determines that the condition of the PBN tolerance in the mode #1 is not satisfied, but the condition of the PBN tolerance in the mode #2 is satisfied.

The OSNR of the optical signal when the mirror setting is not performed is 21.8 (dB), which is larger than the OSNR tolerance of 21 (dB) in the mode #1 and smaller than the OSNR tolerance of 24 (dB) in the mode #2. Accordingly, in the processing of step St3, the transmission quality determination unit 103 determines that the condition of the OSNR tolerance in the mode #1 is satisfied, but the condition of the OSNR tolerance in the mode #2 is not satisfied.

Accordingly, in both the modes #1 and #2, only one condition of the PBN tolerance and the OSNR tolerance is satisfied. For that reason, the transmission quality determination unit 103 determines that the determination result of the determination in step St4 is No.

However, in the mode #1, the condition of the PBN tolerance is not satisfied, but the condition of the OSNR tolerance is satisfied. For that reason, the transmission quality determination unit 103 determines that the determination result of the determination in step St5 is Yes. Therefore, the bandwidth and OSNR of the optical signal when the mirror setting is performed are calculated.

The bandwidth of the optical signal when the mirror setting is performed is 64.4 (GHz), which is larger than the PBN tolerance of 64 (GHz) in the mode #1. Accordingly, in processing of step St8, the transmission quality determination unit 103 determines that the condition of the PBN tolerance in the mode #1 is satisfied.

The OSNR of the optical signal when the mirror setting is performed is 21.5 (dB), which is larger than the OSNR tolerance of 21 (dB) in the mode #1. Accordingly, in the processing of step St8, the transmission quality determination unit 103 determines that the condition of the OSNR tolerance in the mode #1 is satisfied.

For that reason, the transmission quality determination unit 103 determines that the determination result of the determination in step St9 is Yes. Accordingly, in processing of step St10, the setting instruction unit 104 decides the mode of the optical signal to be the mode #1 and decides to perform the mirror setting for the WSS 4.

As described with reference to FIG. 7, if the mirror setting is performed for the WSS 4, the bandwidth of the optical signal may be widened, and thus narrowing of the band is suppressed. For example, in the case of the mode #1, since the baud rate is 64 (Gbaud), when the mirror setting is not performed, the number of the WSSs corresponding to the bandwidth of 64 (GHz) is 3. For that reason, considering that the number of the WSSs of the transmission device 21 of the relay station is 2, the optical signal of the mode #1 may only be transmitted in one span.

However, when the mirror setting is performed for the input-side WSSs 212 and 222 of the transmission devices 21 and 22, narrowing of the band due to the input-side WSSs 212 and 222 is suppressed. For that reason, only the influence of narrowing of the band due to the remaining output-side WSSs 201 and 213 is demanded to be considered, and the number of the WSSs per span is 1, and thus when the number of the WSSs is 3, the maximum number of spans in which transmission is possible is 3.

Figure 22:
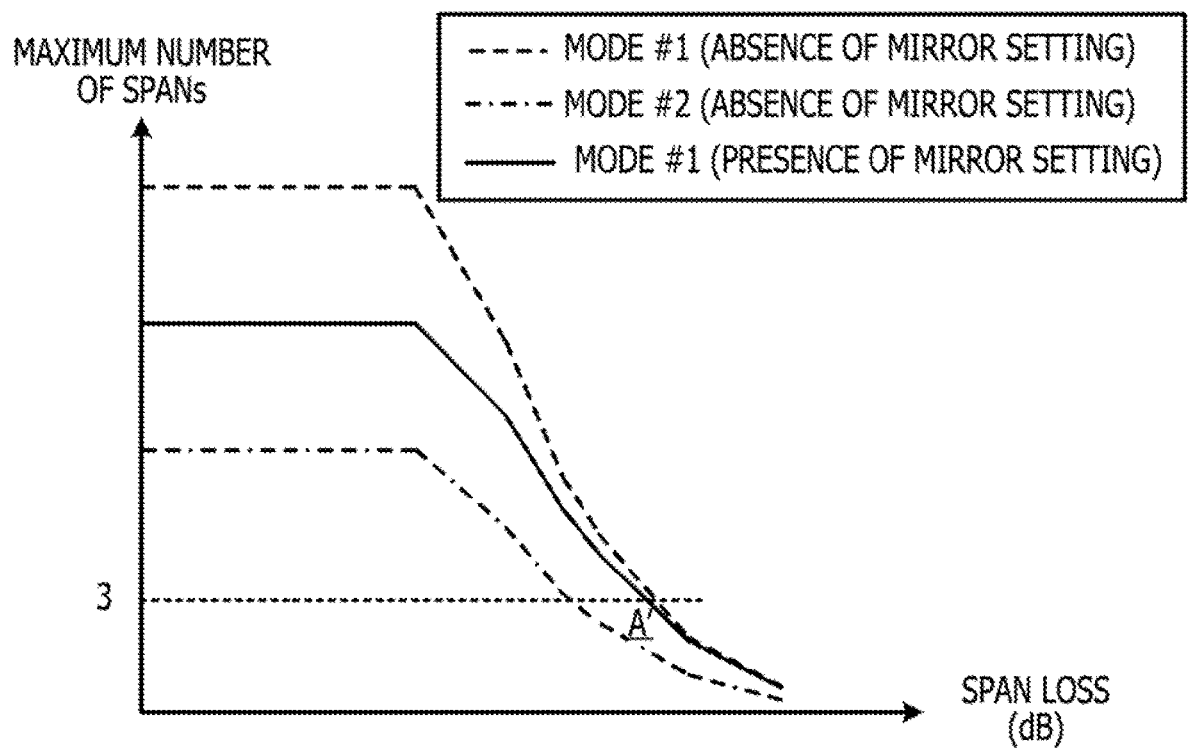
FIG. 22 is a diagram illustrating an example of changes in maximum number of spans in which transmission is possible with respect to span loss.

FIG. 22 is a diagram illustrating an example of changes in the maximum number of spans in which transmission is possible with respect to span loss. The horizontal axis illustrates the span loss, and the vertical axis illustrates the maximum number of spans. The maximum number of spans is calculated from the characteristics of FIG. 18 and the OSNR tolerance of each of the mode #1 and #2.

The dotted line represents the maximum number of spans of the optical signal in the mode #1 when the mirror setting is not performed, and the one-dot chain line represents the maximum number of spans of the optical signal in the mode #2 when the mirror setting is not performed. Since the OSNR tolerance in the mode #1 (21 (dB)) is larger than the OSNR tolerance in the mode #2 (24 (dB)) by 3 (dB), the maximum number of spans in the mode #1 is twice the maximum number of spans in the mode #2.

The solid line represents the maximum number of spans of the optical signal in the mode #1 when the mirror setting is performed. When the mirror setting is performed for all the input-side WSSs 212 and 222, since the WSS loss of one WSS 4 is added, the maximum number of spans in the mode #1 is decreased, but the degree of decrease is smaller than that in the case of FIG. 19. This is because not all WSSs 4 but only some of the WSSs 4 are targets of the mirror setting.

As described above, the maximum number of spans is limited to 3 from the baud rate (64 (Gbaud)) of the mode #1. However, even if the maximum number of spans is in a range 3 or less, the maximum number of spans of the optical signal in the mode #1 when the mirror setting is performed exceeds the maximum number of spans of the optical signal in the mode #2 when the mirror setting is not performed (see region Al and thus the number of spans in which transmission is possible is improved.

(Network Management Device 1 of Second Example)

The network management device 1 according to the first example decides whether or not the mirror setting is possible and the mode, but is not limited thereto. The network management device 1 may also decides the mirror splitting ratio for the mirror setting. The mirror splitting ratio may be fixed to 1 (m:n=1:1) as described with reference to FIGS. 4A and 4B, but may be adjusted to satisfy the condition of transmission quality as in the following example.

Figure 23:
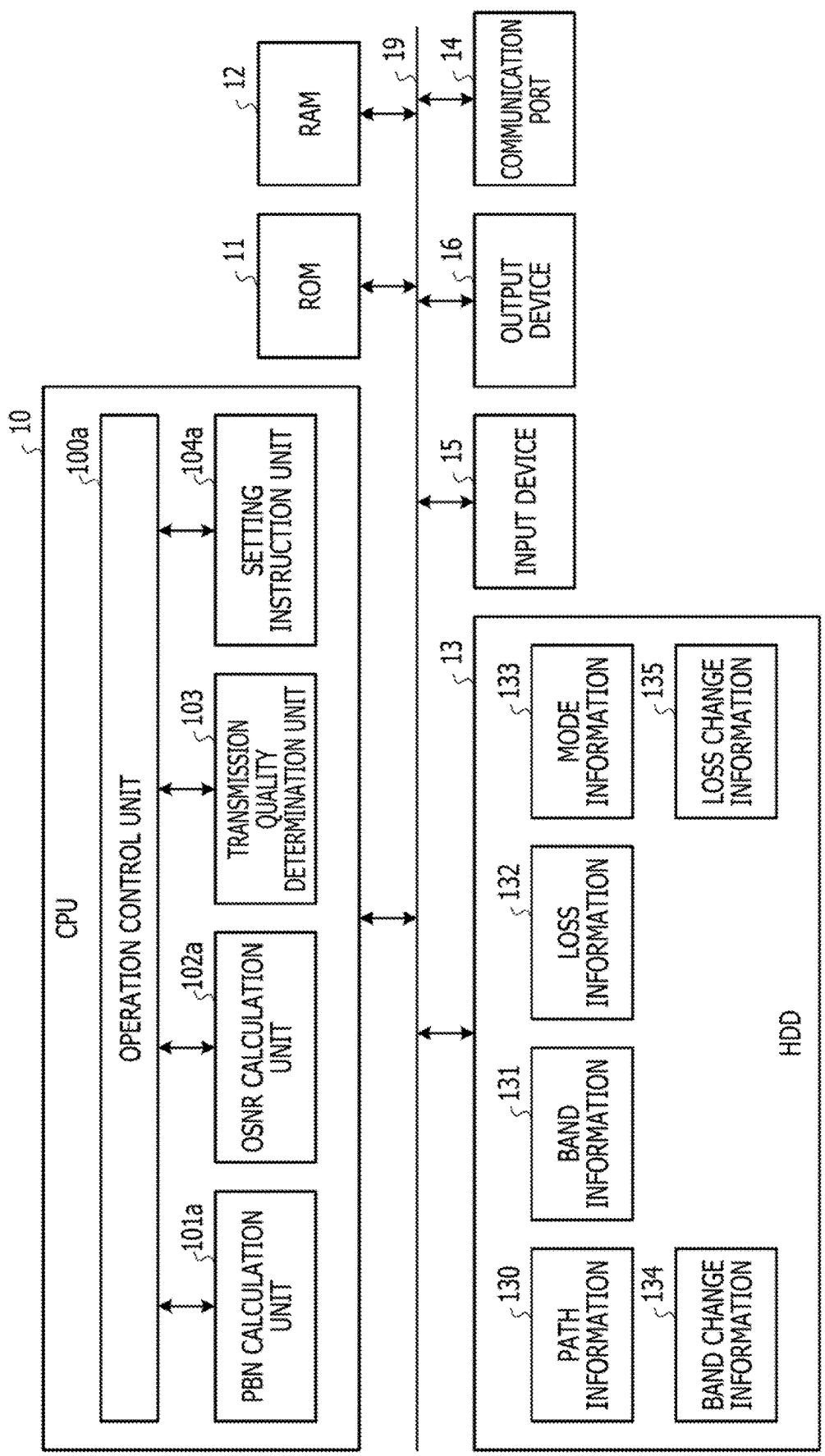
FIG. 23 is a configuration diagram illustrating a network management device of a second example.

FIG. 23 is a configuration diagram illustrating the network management device 1 of a second example. In FIG. 23, the same components as those in FIG. 5 are denoted by the same reference symbols, and the description thereof will be omitted.

When the program is read from the ROM 11, the CPU 10 generates an operation control unit 100a, a PBN calculation unit 101a, an OSNR calculation unit 102a, the transmission quality determination unit 103, and a setting instruction unit 104a as functions. The operation control unit 100a, the PBN calculation unit 101a, the OSNR calculation unit 102a, the transmission quality determination unit 103, and the setting instruction unit 104a are not limited to functions of software, and may be formed by a circuit such as an FPGA or an ASIC which is used instead of the functions of software or together with the functions of software.

The operation control unit 100a controls the overall operation of the network management device 1. The operation control unit 100a instructs the PBN calculation unit 101a, the OSNR calculation unit 102a, the transmission quality determination unit 103, and the setting instruction unit 104a to operate according to an algorithm of the program of the ROM 11. The PBN calculation unit 101a, the OSNR calculation unit 102a, the transmission quality determination unit 103, and the setting instruction unit 104a operate according to the instruction of the operation control unit 100a. In this case, various variables demanded for the operation are added to the operation of instruction.

In the HDD 13, the path information 130, the band information 131, the loss information 132, the mode information 133, band change information 134, and loss change information 135 are stored. The path information 130, the band information 131, the loss information 132, the mode information 133, the band change information 134, and the loss change information 135 are stored in the HDD 13 from the input device 15 via the operation control unit 100a in response to a user's operation, for example.

In the first example, a fixed value at a predetermined mirror splitting ratio is used as the bandwidth and WSS loss when the mirror setting is performed, but in this example, the bandwidth and WSS loss according to the mirror splitting ratio are used. The band change information 134 indicates a change in bandwidth with respect to the mirror splitting ratio, and the loss change information indicates a change in WSS loss with respect to the mirror splitting ratio.

Figure 24A:
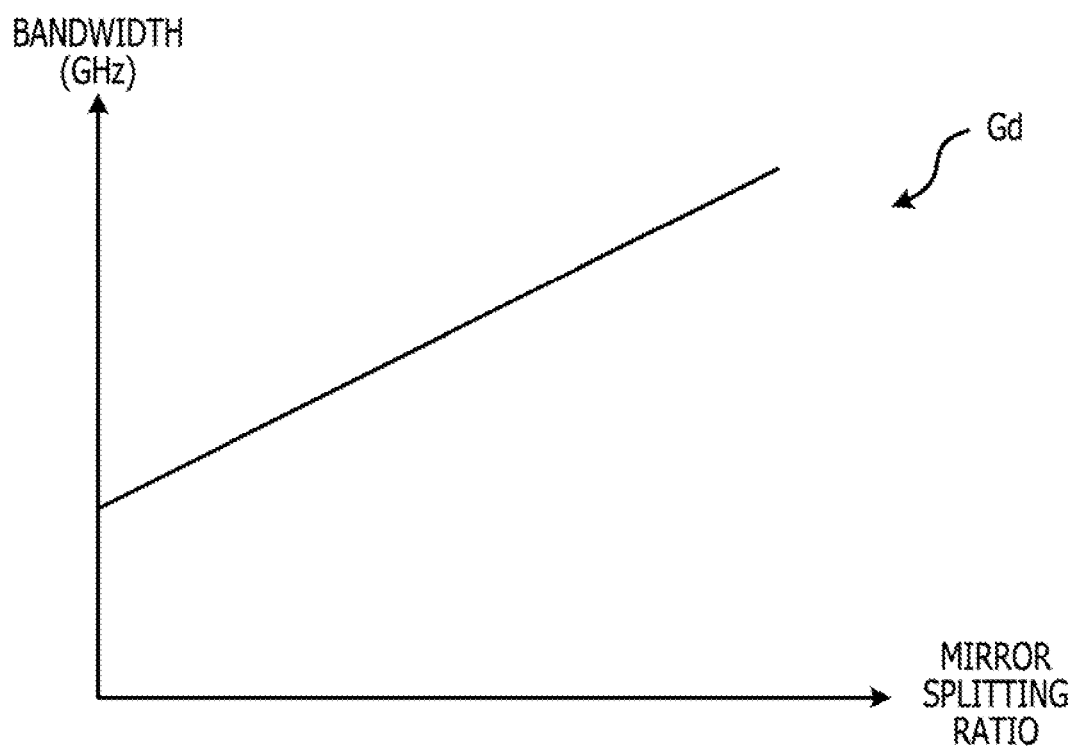
FIG. 24A is a diagram illustrating an example of band change information.
Figure 24B:
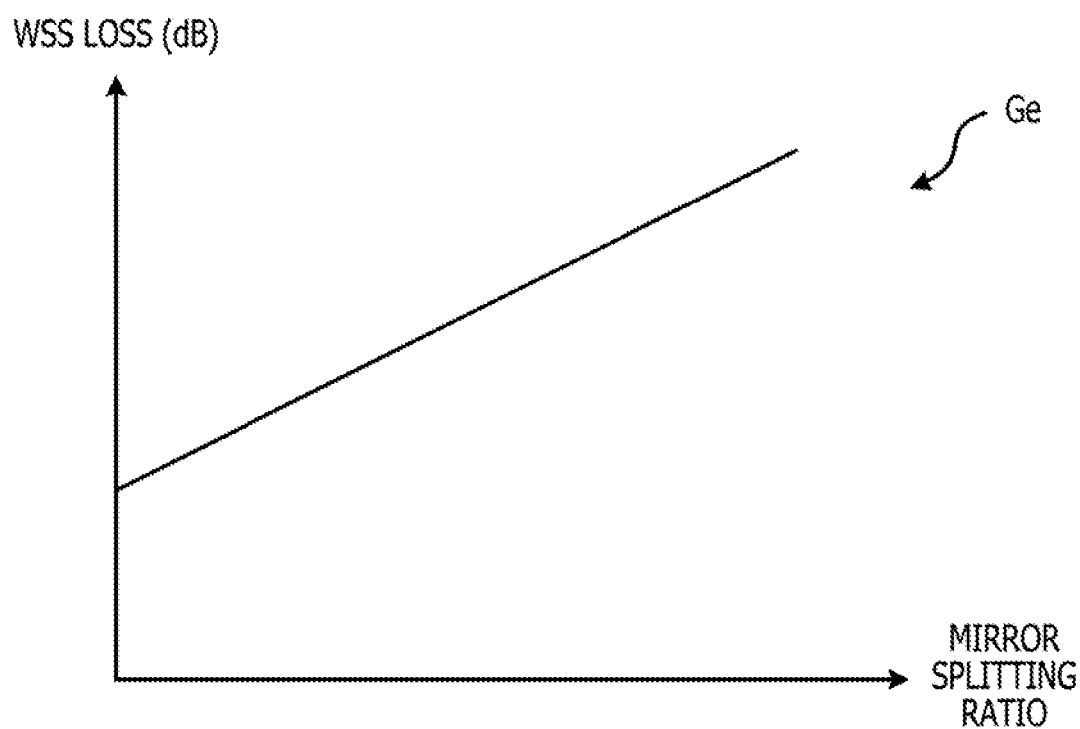
FIG. 24B is a diagram illustrating an example of loss change information.

FIG. 24A is a diagram illustrating an example of the band change information 134. Reference symbol Gd indicates the band change information 134. FIG. 24B is a diagram illustrating an example of t the loss change information 135. Reference symbol Ge indicates the loss change information 135.

In the reference symbol Gd, the horizontal axis represents the mirror splitting ratio, and the vertical axis represents the bandwidth (GHz). The band change information 134 indicates the correspondence relationship between the mirror splitting ratio and the bandwidth. The bandwidth increases as the mirror splitting ratio increases, for example.

In the reference symbol Ge, the horizontal axis represents the mirror splitting ratio and the vertical axis represents the WSS loss (dB). The band change information 134 indicates the correspondence relationship between the mirror splitting ratio and the WSS loss. The WSS loss increases as the mirror splitting ratio increases, for example.

Referring again to FIG. 23, the operation control unit 100a increases the mirror splitting ratio in accordance with the determination result of the transmission quality determination unit 103 and notifies the PBN calculation unit 101a and the OSNR calculation unit 102a of the mirror splitting ratio. For example, the operation control unit 100a increases the mirror splitting ratio when the condition of the OSNR tolerance is satisfied and the condition of the PBN tolerance is not satisfied. In this case, the mirror splitting ratio is increased from 0 to 0.25 (for example, range of m:n=0:10 to 2:8) as an example.

The PBN calculation unit 101a calculates the bandwidth in accordance with the mirror splitting ratio. The PBN calculation unit 101a calculates the bandwidth when the mirror setting is not performed by the same method as the PBN calculation unit 101. The PBN calculation unit 101a calculates the bandwidth when the mirror setting is performed based on the band change information 134, For example, the PBN calculation unit 101a calculates the bandwidth according to the mirror splitting ratio by referring to the band change information 134. The PBN calculation unit 101a is an example of a band calculation unit.

The OSNR calculation unit 102a calculates the OSNR in accordance with the mirror splitting ratio. The OSNR calculation unit 102a acquires the WSS loss according to the mirror splitting ratio from the loss change information 135 instead of the WSS loss of the loss information 132, and calculates the OSNR by the same method as the OSNR calculation unit 102.

As described with reference to FIG. 4, the transmission band (see the reference symbol Hb) of the optical signal in the WSS 4 widens as the mirror splitting ratio increases. For example, the OSNR calculation unit 102a calculates the OSNR in accordance with widening of the transmission band of the optical signal due to the mirror setting, and the PBN calculation unit 101a calculates the bandwidth in accordance with widening of the transmission band of the optical signal due to the mirror setting.

Figure 25:
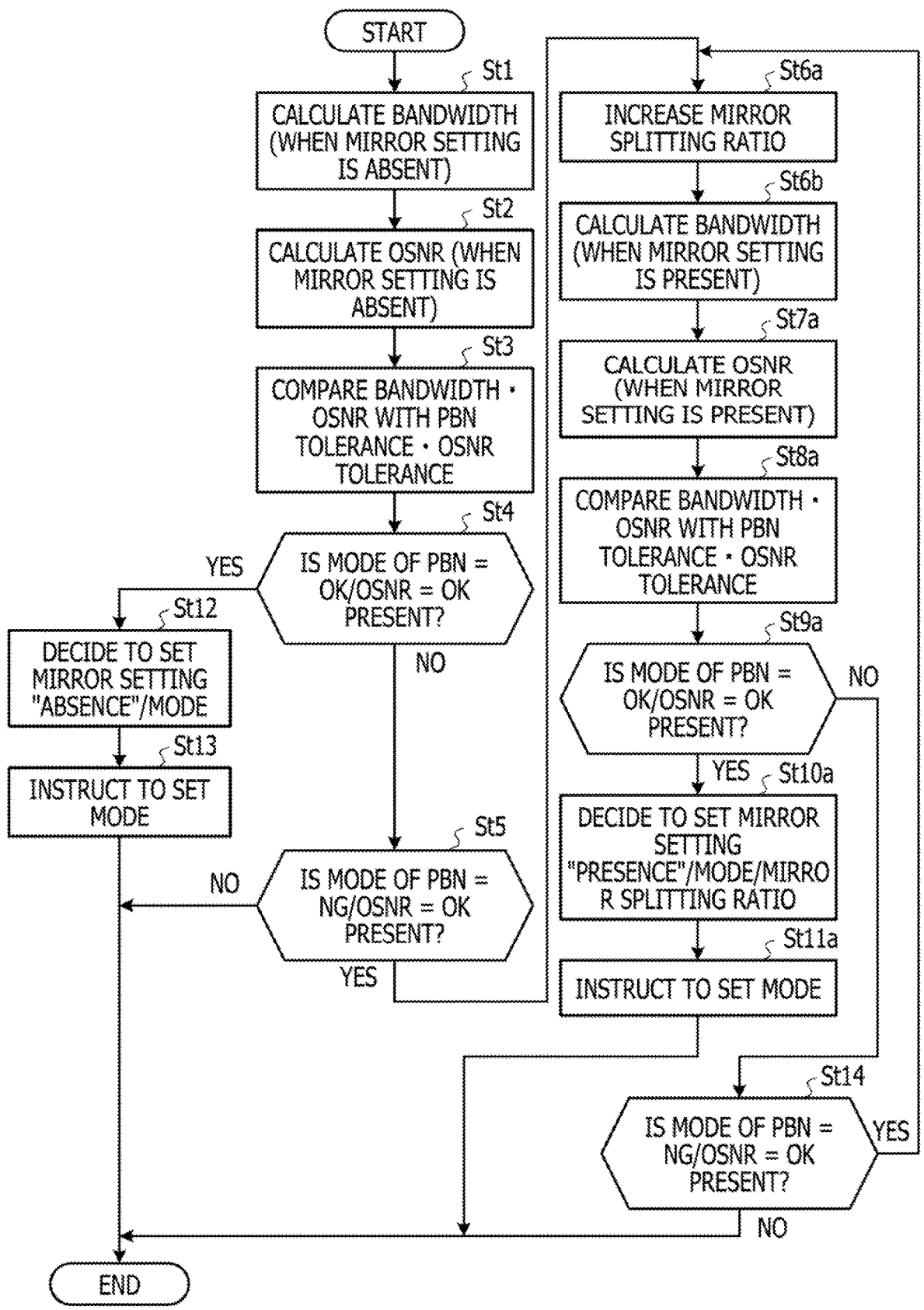
FIG. 25 is a flowchart illustrating an operation of the network management device of the second example.

The setting instruction unit 104a decides to set the mirror splitting ratio when the OSNR and the bandwidth respectively satisfies the conditions of the OSNR tolerance and the PBN tolerance in the WSS 4. For example, the setting instruction unit 104a decides to set widening of the transmission band of the optical signal due to the mirror setting for the WSS 4. With this configuration, the optimum mirror splitting ratio is set in the WSS 4 so that the OSNR and the bandwidth respectively satisfies the conditions of the OSNR tolerance and the PBN tolerance. The setting instruction unit 104a is an example of a decision processing unit FIG. 25 is a flowchart illustrating an operation of the network management device 1 of the second example. In FIG. 25, the processing common to those in FIG. 10 are denoted by the same reference symbol, and the description thereof will be omitted.

When it is determined that a mode in which the bandwidth does not satisfy the condition of the PBN tolerance and the OSNR satisfies the condition of the OSNR tolerance is present (Yes in Step St5), the operation control unit 100a increases the mirror splitting ratio (step St6a). The operation control unit 100a increases the mirror splitting ratio by a predetermined value, for example.

The PBN calculation unit 101a calculates the bandwidth in the case of the presence of mirror setting based over the path information 130 and the band change information 134 (step St6b). Next, the OSNR calculation unit 102a calculates the OSNR in the case of the presence of mirror setting based over the path information 130, the loss information 132, and the loss change information 135 (step St7a).

Next, the transmission quality determination unit 103 compares the bandwidth and the OSNR with the PBN tolerance and the OSNR tolerance of the mode information 133, respectively (step St8a). Next, the transmission quality determination unit 103 determines whether or not a mode, in which the bandwidth and the OSNR respectively satisfies the conditions of the PBN tolerance and the OSNR tolerance ("OK"), is present among the modes #1 and #2 of the mode information 133 (step St9a).

When it is determined that the mode, in which the bandwidth and the OSNR in the case of the presence of mirror setting respectively satisfies the conditions of the PBN tolerance and the OSNR tolerance, is absent, (No in Step St9a), the transmission quality determination unit 103 determines whether or not a mode, in which the bandwidth does not satisfy the condition of the PBN tolerance ("NG") and the OSNR satisfies the condition of the OSNR tolerance ("OK") (step St14), is present.

When it is determined that the mode in which the bandwidth does not satisfy the condition of the PBN tolerance and the OSNR satisfies the condition of the OSNR tolerance is present (Yes in step St14), the operation control unit 100a increases the mirror splitting ratio (step St6a). Thereafter, each processing in and after step St6b is executed.

When it is determined that the mode in which the bandwidth does not satisfy the condition of the PBN tolerance and the OSNR satisfies the condition of the OSNR tolerance is absent (No in step St14), the operation control unit 100a determines that the mode in which transmission is possible, and ends the process. In this way, the operation control unit 100a increases the mirror splitting ratio until the OSNR becomes less than the OSNR tolerance.

When it is determined that the mode, in which the bandwidth and the OSNR in the case of the presence of mirror setting respectively satisfies the conditions of the PBN tolerance and the OSNR tolerance, is present (Yes in Step St9a), the setting instruction unit 104a decides to set the mode in the transmission-side TP 30 and the reception-side TP 31 as the mode of the optical signal, decides to perform the mirror setting for WSS 4 (mirror setting "presence"), and decides a mirror splitting ratio to be set for the WSS 4 (step St10a).

Next, the setting instruction unit 104*a* instructs the transmission-side TP 30 and the reception-side TP 31 to set the mode, and instructs each WSS 4 to set the mirror setting and the mirror splitting ratio (step St11*a*). In this case, each of the device control units 200, 210 and 220 of the transmission devices 20 to 22 selects the mirror 43 of which the angle is to be set according to the mirror splitting ratio instruction, and sets the angle of each mirror 43 of the mirror array 44 according to the mirror setting instruction.

In this way, the network management device 1 operates.

As such, the setting instruction unit 104*a* decides to set widening of the transmission band of the optical signal due to the mirror setting in the WSS 4. With this configuration, the optimum mirror splitting ratio is set in the WSS 4 so that the OSNR and the bandwidth respectively satisfies the conditions of the OSNR tolerance and the PBN tolerance.

The embodiment described above is an exemplary example of the present disclosure. However, the embodiment is not limited thereto, and various modifications may be made thereto without departing from the scope of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A network system comprising:
   a plurality of transmission devices, each of which being provided with a wavelength selective switch including a wavelength filter, configured to transmit an optical signal for each channel; and
   a management device configured to manage the plurality of transmission devices, wherein
   the wavelength selective switch configured to enable band setting that widens a transmission band of an optical signal of a predetermined channel to the wavelength filter of an adjacent channel,
   the management device is further configured to:
      calculate an OSNR of the optical signal of the predetermined channel based on power loss due to the wavelength filter over a path of the optical signal of the predetermined channel;
      calculate a bandwidth of the optical signal of the predetermined channel according to narrowing due to the wavelength filter over the path;
      determine whether or not the OSNR and the bandwidth respectively satisfies a condition of transmission quality of the optical signal of the predetermined channel; and
      decide whether or not to cause the wavelength selective switch to perform the band setting based on a result of the determination.

2. The network system according to claim 1, wherein
   the management device is configured to, when the bandwidth out of the OSNR and the bandwidth when the transmission band of the optical signal of the predetermined channel is not widened does not satisfy the condition of the transmission quality, decide to perform the band setting when the OSNR and the bandwidth when the transmission band of the optical signal of the predetermined channel is widened respectively satisfies the condition of the transmission quality.

3. The network system according to claim 1, wherein
   the management device is configured to, when the OSNR and the bandwidth in a case where the transmission band of the optical signal of the predetermined channel is not widened respectively satisfies the condition of the transmission quality, decide not to perform the band setting.

4. The network system according to claim 1, wherein the management device is further configured to:
   make a determination using the condition of the transmission quality according to a combination of a multilevel degree of modulation and a baud rate of the optical signal of the predetermined channel; and
   decide to set the combination of the multilevel degree of modulation and the baud rate in a case where the OSNR and the bandwidth respectively satisfies the condition of the transmission quality in the optical signal of the predetermined channel.

5. The network system according to claim 1, wherein the management device is further configured to:
   calculate the OSNR in accordance with a widening of the transmission band due to the band setting;
   calculate the bandwidth in accordance with widening of the transmission band due to the band setting; and
   make a decision to set widening of the transmission band of the optical signal of the predetermined channel in the wavelength selective switch in a case where the OSNR and the bandwidth respectively satisfies the condition of the transmission quality of the optical signal of the predetermined channel.

6. The network system according to claim 1, wherein
   in the wavelength selective switch, when the band setting is performed, the transmission band of the optical signal of the predetermined channel is widened and the power loss of the optical signal of the predetermined channel is increased.

7. The network system according to claim 1, wherein the wavelength selective switch is configured to:
   include a mirror array for each channel which functions as the wavelength filter and is arranged in a first direction, and a plurality of ports onto which an optical signal reflected by the mirror array is incident; and
   when the band setting is performed, control angles of mirrors of a first region and mirrors of a second region to different values so that optical signals are incident on different ports of the plurality of ports from the mirrors of the first region and the mirrors of the second region, which are obtained by dividing the mirror array by a ratio of 1:1 in a second direction perpendicular to the first direction.

8. A management device comprising:
   a memory; and
   a processor coupled to the memory and configured to control a plurality of transmission devices, each of which being provided with a wavelength selective switch including a wavelength filter that transmits an optical signal for each channel, the wavelength selective switch enabling band setting that widens a transmission band of an optical signal of a predetermined channel to the wavelength filter of an adjacent channel,
   wherein the processor is further configured to:
      calculate an OSNR of the optical signal of the predetermined channel based on power loss due to the wavelength filter over a path of the optical signal of the predetermined channel;

calculate a bandwidth of the optical signal of the predetermined channel according to narrowing due to the wavelength filter over the path;

determine whether or not the OSNR and the bandwidth respectively satisfies a condition of transmission quality of the optical signal of the predetermined channel; and decide whether or not to cause the wavelength selective switch perform the band setting based on a result of the determination.

9. A management method of a management device for managing a plurality of transmission devices, comprising:

calculating an OSNR of an optical signal of a predetermined channel based on power loss due to a wavelength filter over a path of the optical signal of the predetermined channel, the wavelength filter transmitting an optical signal for each channel and being included in a wavelength selective switch provided in each of the plurality of transmission devices, the wavelength selective switch enabling band setting that widens a transmission band of the optical signal of a predetermined channel to the wavelength filter of an adjacent channel;

calculating a bandwidth of the optical signal of the predetermined channel according to narrowing due to the wavelength filter over the path;

determining whether or not the OSNR and the bandwidth respectively satisfies the condition of transmission quality of the optical signal of the predetermined channel; and deciding whether or not to cause the wavelength selective switch to perform the band setting based on a result of the determining.

* * * * *